(12) United States Patent
Limbacher, Jr.

(10) Patent No.: US 7,604,075 B1
(45) Date of Patent: Oct. 20, 2009

(54) AMBULATORY VEHICLE

(76) Inventor: H. Phillip Limbacher, Jr., 2742 Buena View Ct., San Jose, CA (US) 95121

( * ) Notice: Subject to any disclaimer, the term of this patent is extended or adjusted under 35 U.S.C. 154(b) by 167 days.

(21) Appl. No.: 11/484,788

(22) Filed: Jul. 10, 2006

Related U.S. Application Data

(60) Provisional application No. 60/697,897, filed on Jul. 8, 2005.

(51) Int. Cl.
*B62D 51/06* (2006.01)
(52) U.S. Cl. .................. 180/8.5; 180/8.1; 900/1
(58) Field of Classification Search .......... 248/127; 900/1; 180/8.5, 8.6, 8.2; 74/5 R, 5.2, 5.4
See application file for complete search history.

(56) References Cited

U.S. PATENT DOCUMENTS

| | | | |
|---|---|---|---|
| 1,344,571 A | | 6/1920 | Anderson |
| 4,321,976 A | | 3/1982 | Reinke et al. |
| 4,363,411 A | | 12/1982 | Blair et al. |
| 4,527,650 A | * | 7/1985 | Bartholet .............. 180/8.6 |
| 4,662,465 A | | 5/1987 | Stewart |
| 4,674,949 A | | 6/1987 | Kroczynski |
| 4,790,400 A | | 12/1988 | Sheeter |
| 4,834,200 A | * | 5/1989 | Kajita ................ 180/8.1 |
| 4,977,971 A | | 12/1990 | Crane, III et al. |
| 5,005,658 A | | 4/1991 | Bares et al. |
| 5,105,862 A | * | 4/1992 | Skinner et al. ............ 144/287 |
| 5,127,484 A | | 7/1992 | Bares et al. |
| 5,219,410 A | | 6/1993 | Garrec |
| 5,359,957 A | | 11/1994 | Askestad |
| 5,592,981 A | * | 1/1997 | Derecktor ............. 144/286.1 |
| 5,685,383 A | * | 11/1997 | Ferrante .............. 180/8.6 |
| 5,758,734 A | * | 6/1998 | Hong et al. ............ 180/8.1 |
| 5,836,365 A | * | 11/1998 | Derecktor ............. 144/287 |
| 5,842,533 A | | 12/1998 | Takeuchi |
| 5,890,553 A | | 4/1999 | Bar-Cohen et al. |
| 5,929,585 A | * | 7/1999 | Fujita ................. 318/568.2 |
| 5,945,625 A | | 8/1999 | Zielinski |
| 6,068,073 A | * | 5/2000 | Roston et al. ........... 180/8.5 |
| 6,105,695 A | | 8/2000 | Bar-Cohen et al. |
| 6,244,450 B1 | | 6/2001 | Woodling |

(Continued)

FOREIGN PATENT DOCUMENTS

DE 10032640 A1 * 1/2002

OTHER PUBLICATIONS

Ambulatory Robotics Lab, Centre for Intelligent Machines, McGill University, Montreal, Canada, http://www.cim.mcgill.ca/~arlweb/.

(Continued)

*Primary Examiner*—A. Joseph Wujciak, III
(74) *Attorney, Agent, or Firm*—Carr & Ferrell LLP

(57) ABSTRACT

A legged ambulatory vehicle for transporting a load from a first location to a second location is disclosed. The ambulatory vehicle comprises a load that is able to shift the center of gravity of the ambulatory vehicle along a length of a beam assembly. Additionally, the leg assemblies of the ambulatory vehicle are configured to exchange places along the length of the beam assembly. Further, the vehicle is able to perform a number of gaits including a slow stable gait and faster dynamic gaits comprising striding, trotting, and bounding. The ambulatory vehicle is able to navigate rough terrain and steep slopes and navigate submerged.

15 Claims, 26 Drawing Sheets

Pass Through
Side View

U.S. PATENT DOCUMENTS

| | | | |
|---|---|---|---|
| 6,422,329 | B1 | 7/2002 | Kazerooni et al. |
| 6,588,701 | B2 | 7/2003 | Yavnai |
| 6,688,451 | B2 | 2/2004 | Derby |
| 6,745,804 | B2 * | 6/2004 | Welsh et al. ............... 144/287 |
| 6,964,309 | B2 | 11/2005 | Quinn et al. |
| 6,992,456 | B2 * | 1/2006 | Furuta et al. ........... 318/568.12 |
| 7,237,468 | B2 | 7/2007 | Laine |
| 2002/0023788 | A1 | 2/2002 | Torrie |
| 2002/0060267 | A1 | 5/2002 | Yavnai |
| 2002/0179342 | A1 | 12/2002 | Quinn |
| 2005/0133280 | A1 | 6/2005 | Horchler et al. |
| 2007/0131306 | A1 * | 6/2007 | Snider .................... 144/286.1 |
| 2008/0109115 | A1 * | 5/2008 | Lim ........................... 700/258 |
| 2008/0129239 | A1 * | 6/2008 | Lee et al. ............... 318/568.11 |
| 2008/0150465 | A1 * | 6/2008 | Baba et al. ............. 318/568.12 |

OTHER PUBLICATIONS

"Big Dog", Boston Dynamics, 2005, http://www.bdi.com/content/sec.php?section=BigDog.

Hambling, David, "Robotic 'Pack Mule' Displays Stunning Reflexes", NewScientist.com, Mar. 3, 2006, http://vvww.newscientist.com/article.ns?id=dn8802&print=true.

"Thoughtful Robot Adapts to Injury", NewScientistTech, Nov. 17, 2006, http://www.newscientisttech.com/channel/tech/robots/.

"Biologically Inspired Multifuntional Dynamic Robots", DARPA Defense Services Office, http://www.darpa.mil/dso/thrust/biosci/biodynotics.htm.

"8.0 Centre of Mass Robot", Oct. 2002, http://web.archive.org/web/20021002033031/ http://carvenjim.tripod.com/robotics/Cronological001/xtceframes-2.htm.

Intelligent Embedded Systems, Climbing Robots, http://www.iti.uni-luebeck.de/Research/NC/IES/ClimbingRobots/.

Intelligent Embedded Systems, Walking Robots, http://www.iti.uni-luebeck.de/Research/NC/IES/WalkingRobots#FRED-II.

Oricom Technologies, Robotics Index (8)- Locomotion, 2005, http://www.oricomtech.com/misc/roboInk8.htm.

Oricom Technologies, Quadruped Locomotion-Musings About Running Dogs and Other 4-Legged Creatures, Sep. 21, 2001, updated Nov. 2006, http://www.oricomtech.com/projects/legs.htm.

Jet Propulsion Laboratory, California Institute of Technology, http://www-robotics.jpl.nasa.gov/systems/index.cfm.

Shachtman, Noah, "Drone Doggie Built for War", Military.com, DefenseTech.org, Jan. 7, 2004, http://www.defensetech.org/archives/000711.html.

Timperi, Arto, Timberjack-Plustec: A John Deere Company, Tampere, Finland, http://www.norbe.kvl.dk/webs/ibe_course/pdf/plustech.pdf.

* cited by examiner

Pass Through
Side View

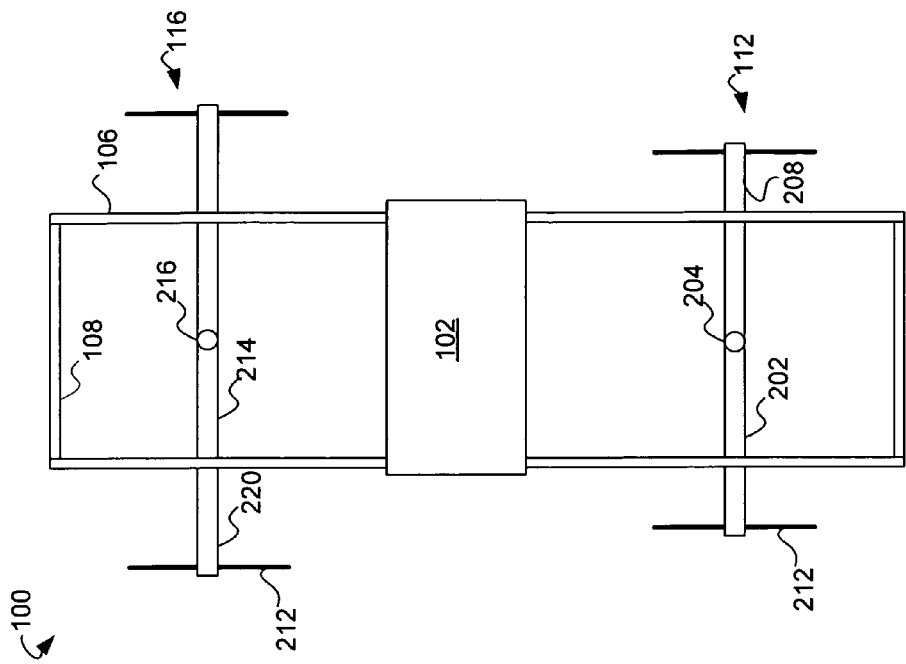
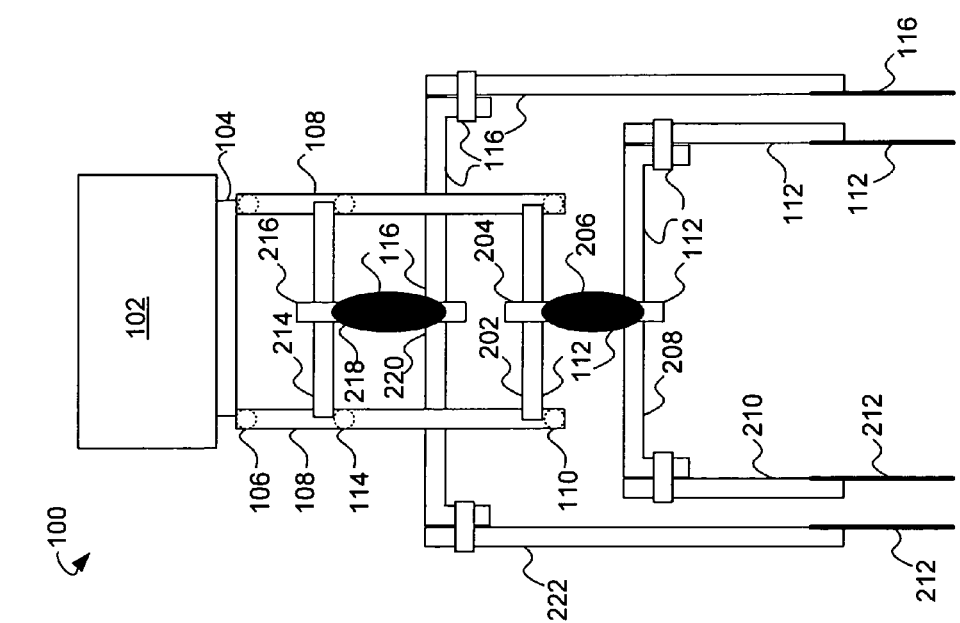
**FIGs. 2A-2B
Pass Through**
FIG. 2B
Top View
FIG. 2A
Rear View Pass Around
Side View**

Walking Leg A

Walking Leg A

Walking Leg A

Walking Leg B

Walking Leg B

Walking Leg B
Side View

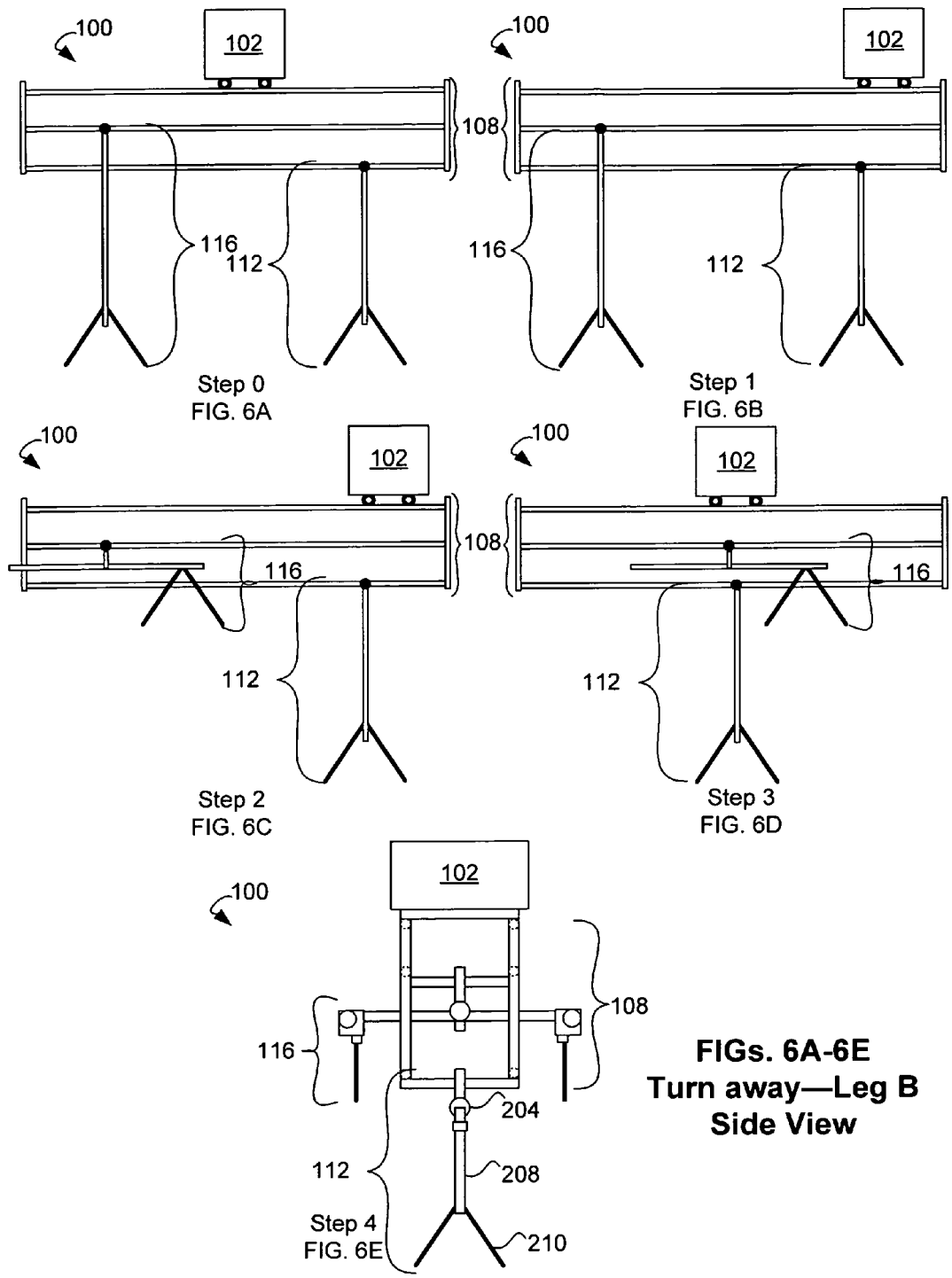

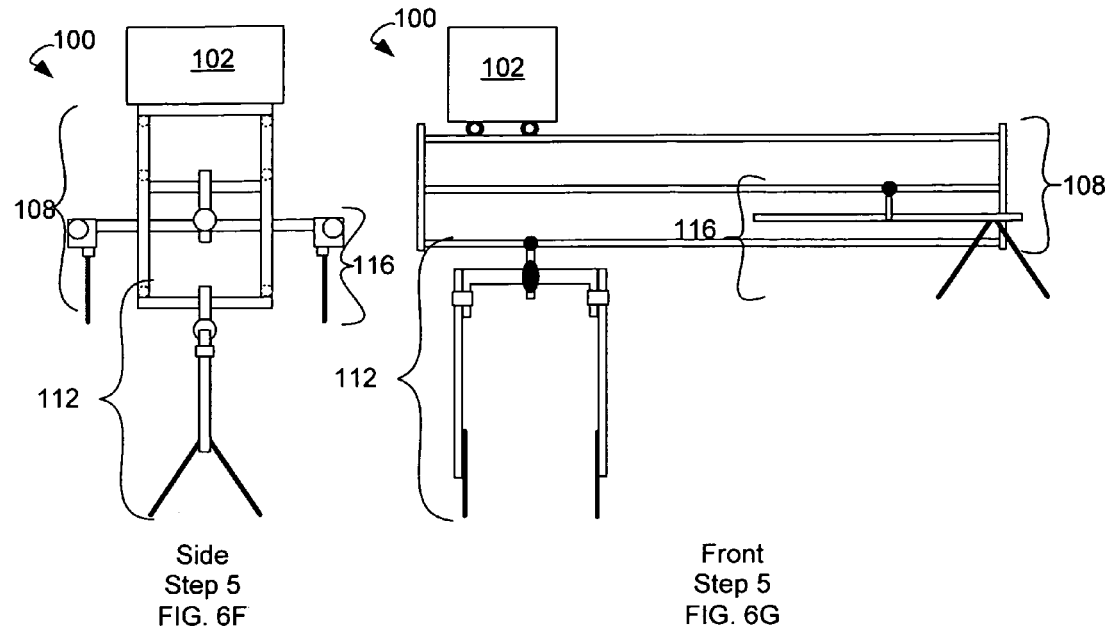
Side
Step 5
FIG. 6F
Front
Step 5
FIG. 6G
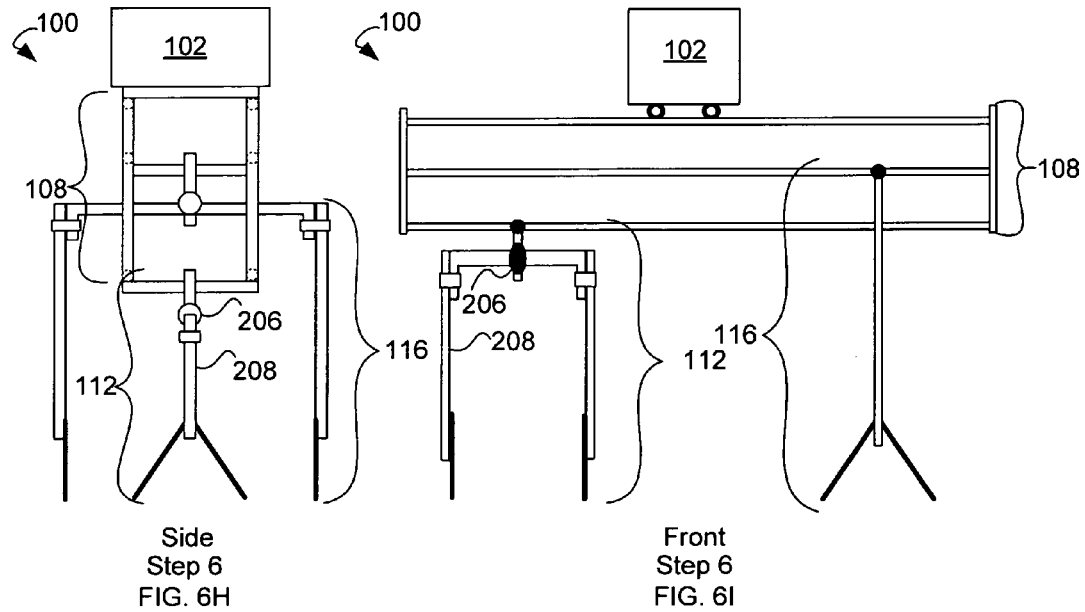
Side
Step 6
FIG. 6H
Front
Step 6
FIG. 6I
**FIGs. 6F-6I
Turn away—Leg B
Dual Views**

Stairs
Side View

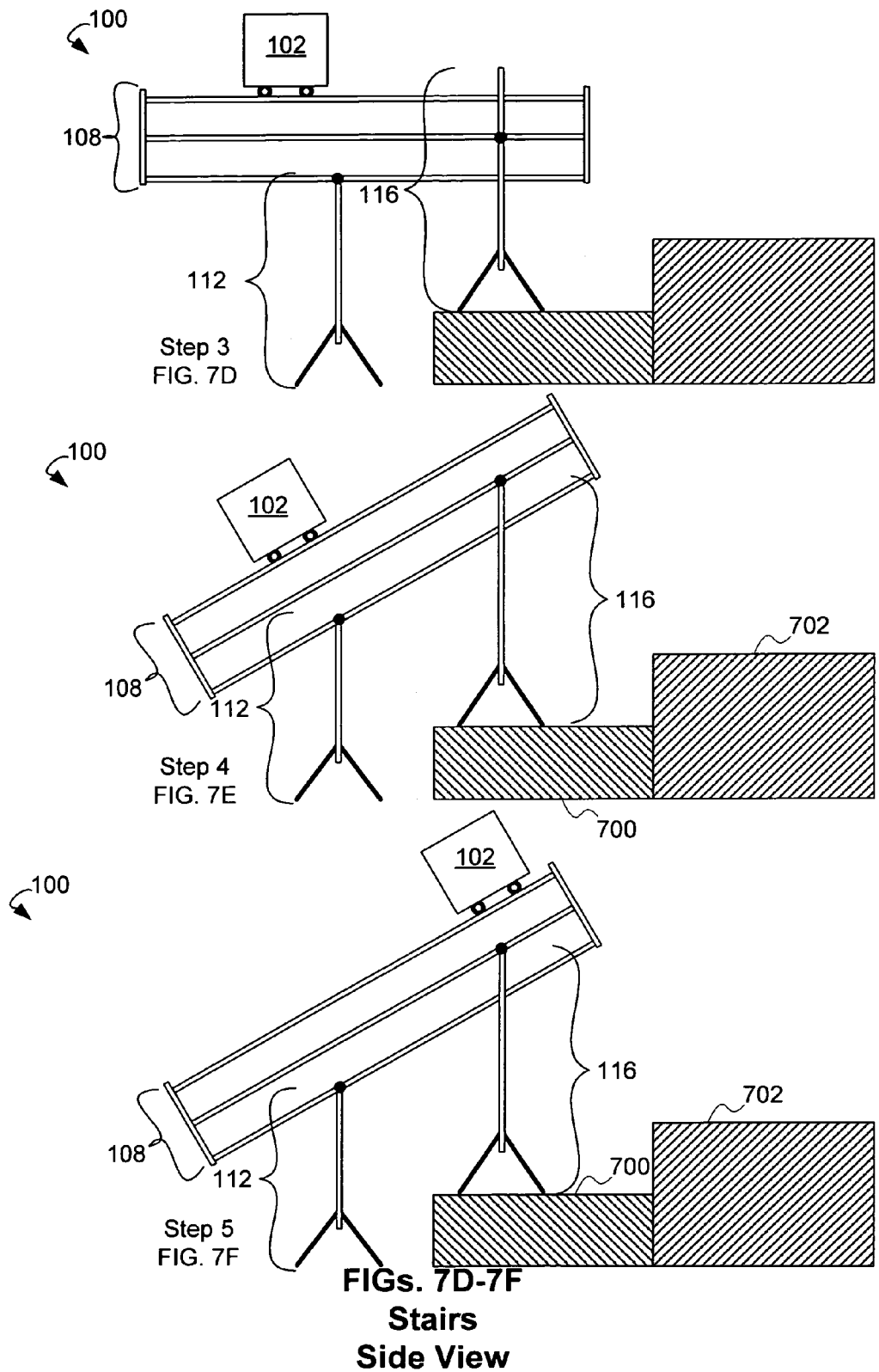

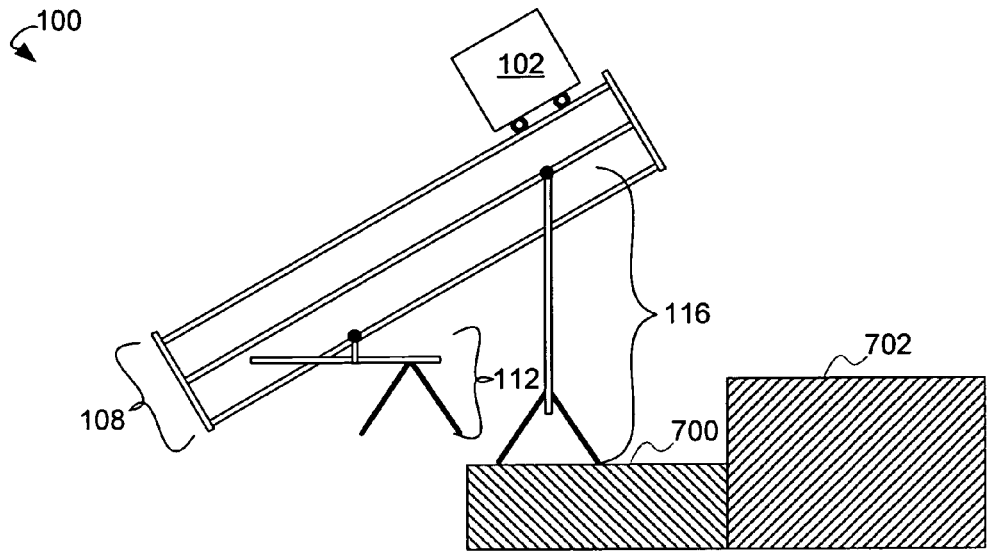
Step 6
FIG. 7G
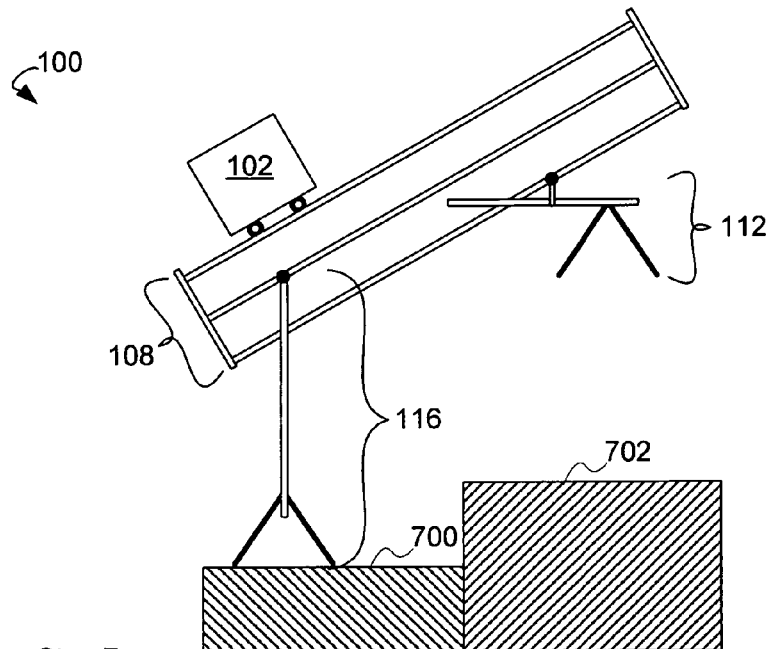
Step 7
FIG. 7H
**FIGs. 7G-7H
Stairs
Side View**

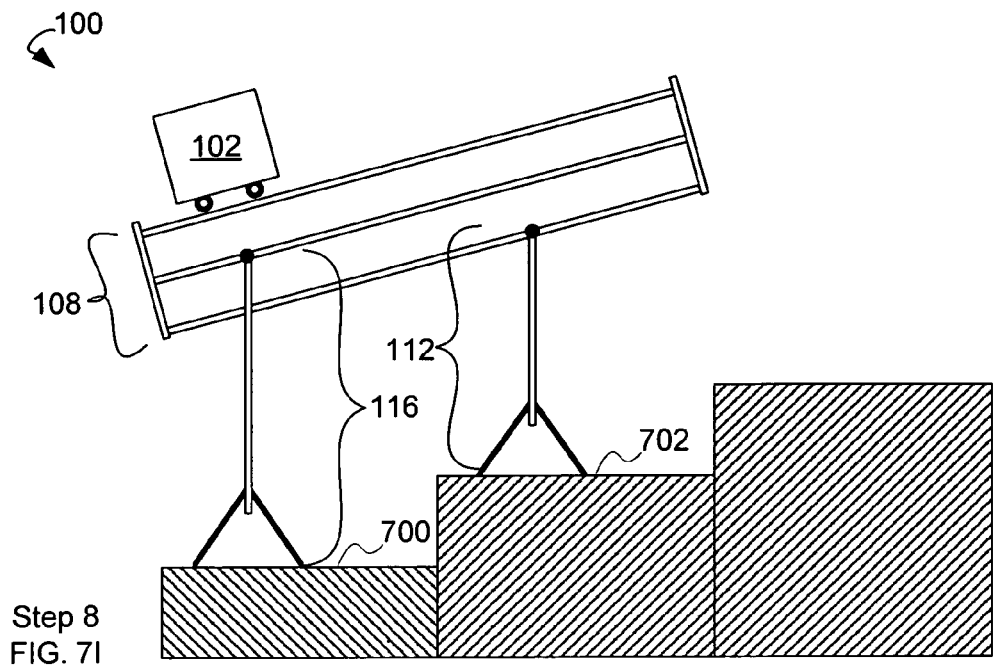
Step 8
FIG. 7I
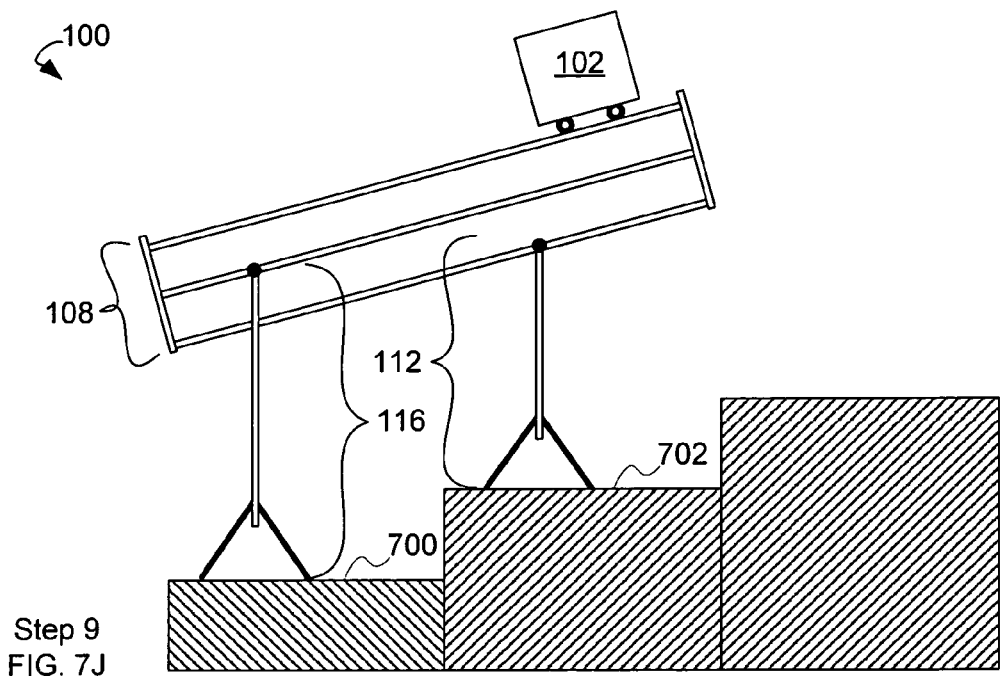
Step 9
FIG. 7J
FIGs. 7I-7J

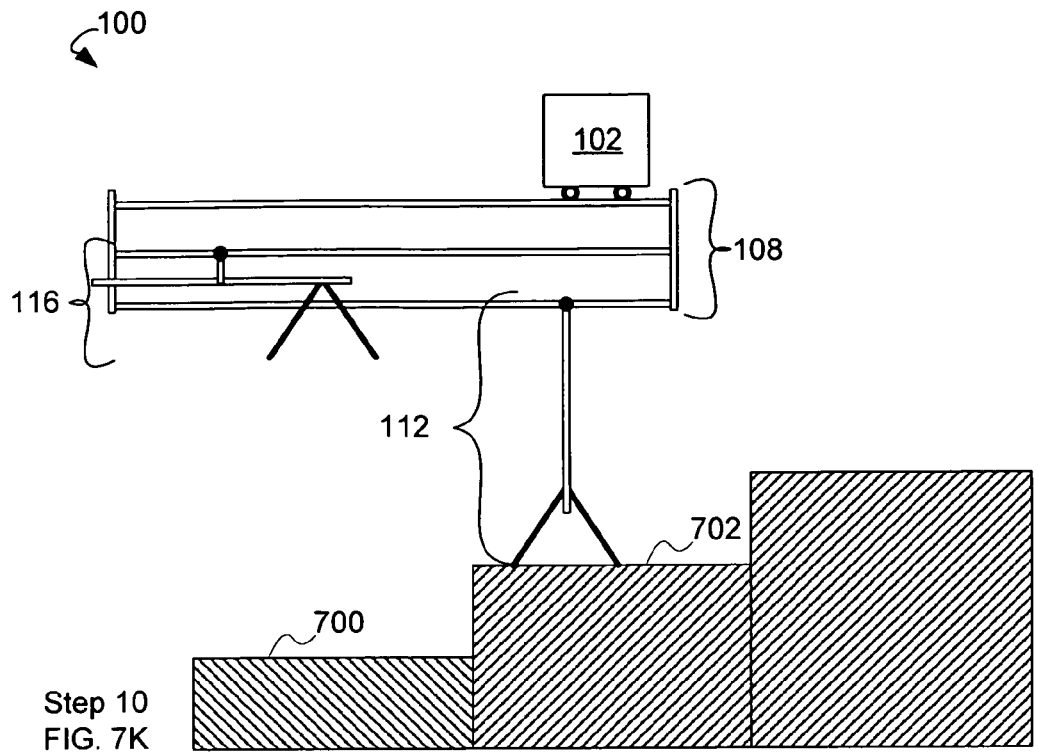
Step 10
FIG. 7K
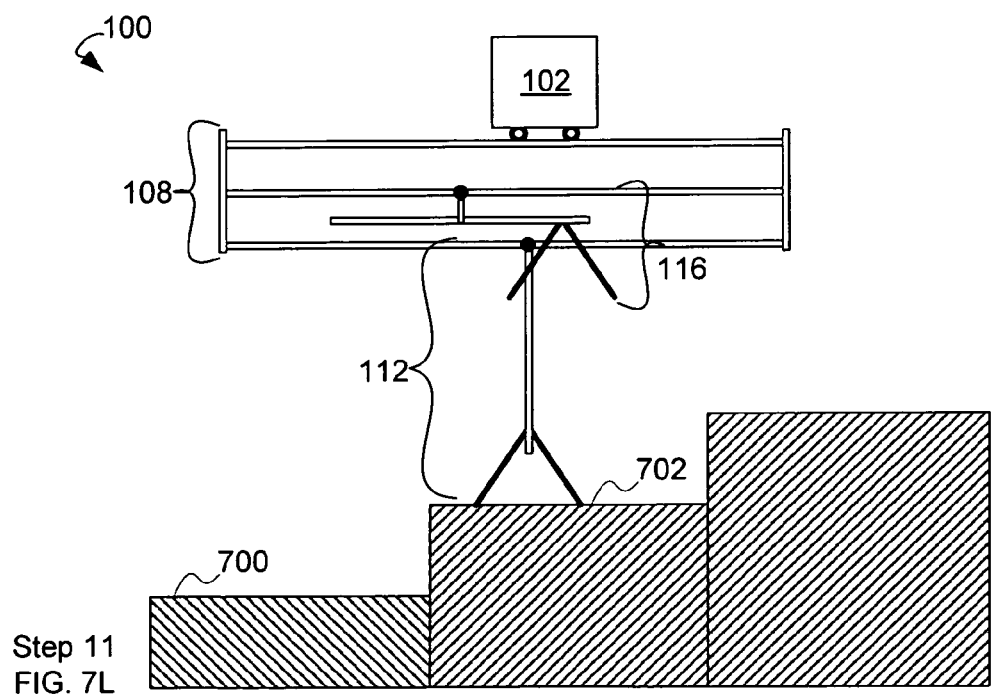
Step 11
FIG. 7L
FIGs. 7K-7L
Stairs
Side View

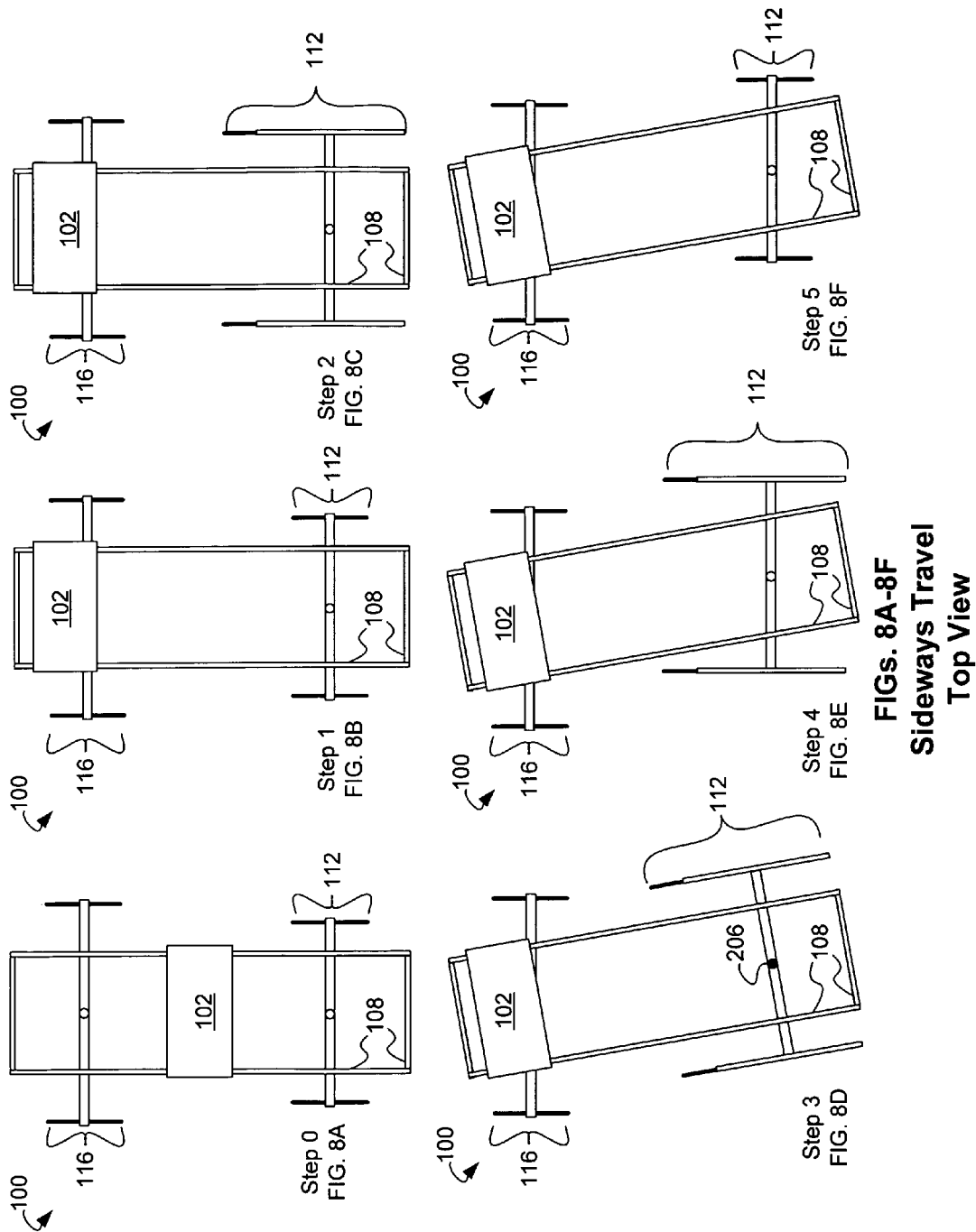

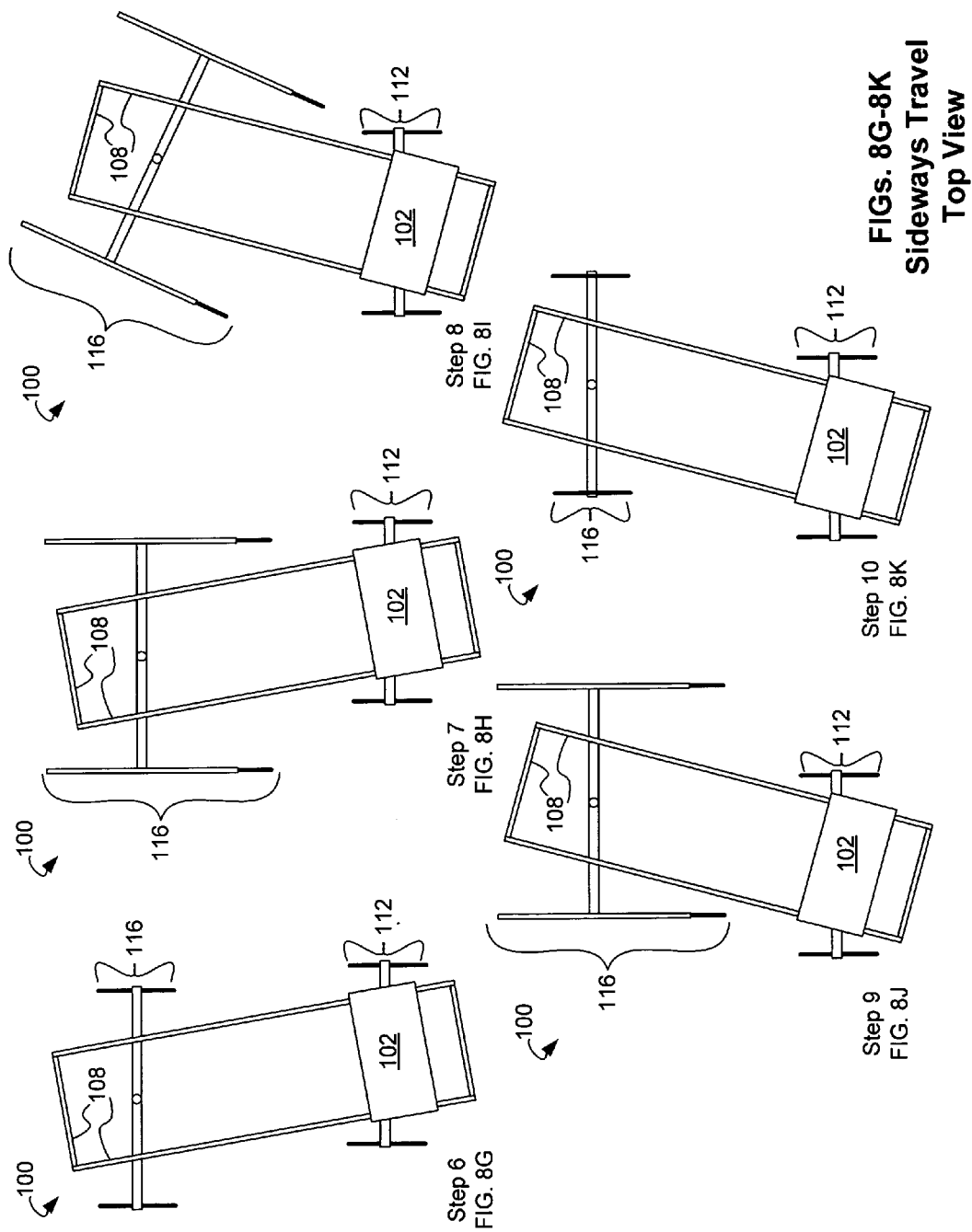

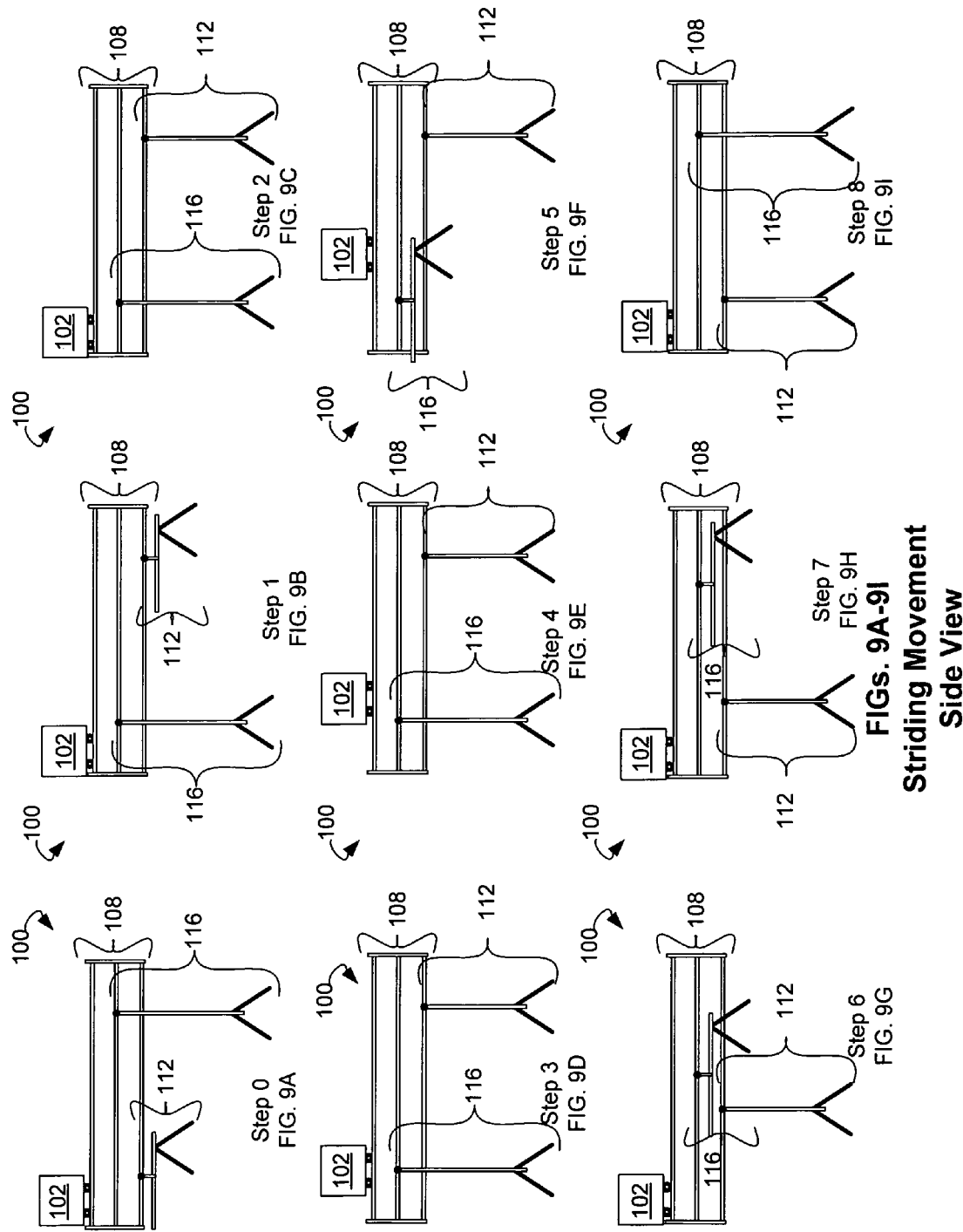

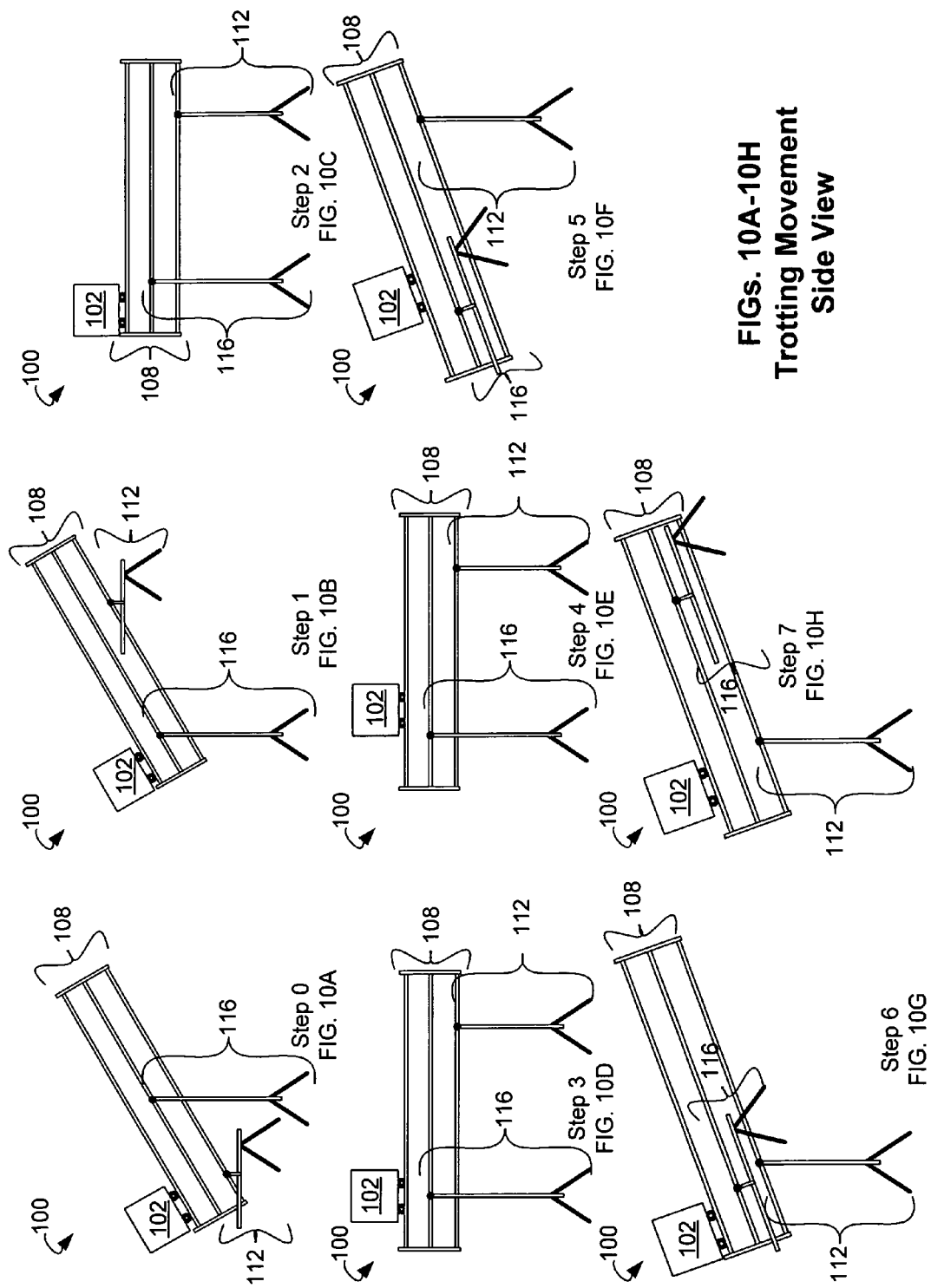

Bounding Movement
Side View

Three-legged Transporters
Side View

Three-Legged Walk
Side View

Method of Walking

Method of Stair Climbing

Method of Sideways Motion

AMBULATORY VEHICLE

CROSS-REFERENCE TO RELATED APPLICATIONS

This patent application claims priority to provisional U.S. patent application No. 60/697,897 filed Jul. 8, 2005 and entitled "X-Terrain Linear Pass-Thru Stepper." The disclosure of the above United States provisional patent application is hereby incorporated herein by reference.

BACKGROUND OF THE INVENTION

1. Field of the Invention

This invention relates generally to surface vehicles and more specifically to vehicles, which can be operator and/or robotically controlled.

2. Description of the Related Art

Surface vehicles, which can be either operator or robotically controlled, have included wheeled, tracked, and legged vehicles. Existing vehicles of these types are insufficient because they are limited in their ability to travel over uneven terrain and to operate in noxious environments, including submersion in a liquid, etc. Wheeled and tracked vehicles are limited in the types of terrain they can traverse, while legged vehicles tend to be slow and inefficient. There is, therefore, a need for an all-terrain ambulatory vehicle that can be controlled by either an operator or robotically controlled that and travels efficiently and quickly or over a variety of terrain.

SUMMARY

An ambulatory vehicle comprising two or more leg assemblies and a beam assembly is configured to transport a load from a first location to a second location. The leg assemblies each comprise legs and are configured to exchanges places with each other during movement. For example, a forward leg assembly may exchange places with a rear leg assembly and vice-versa. While the rear leg assembly is being shifted, the forward leg assembly supports the transport system alone.

In continuously stable gaits or when the vehicle is at rest, the positions of various vehicle components are coordinated so that the vehicle's center of gravity is either between two supporting leg assemblies, or approximately over a supporting leg assembly. As such, the vehicle's center of gravity is continuously supported by at least one leg assembly. In dynamic gaits, any tendencies for a supporting leg assembly to tilt in an undesirable direction due to the weight of vehicle components are effectively cancelled out by forces generated from the accelerations or decelerations of vehicle components.

There are multiple ways in which the leg assemblies may exchange places. In some embodiments, the leg assemblies pass through each other. In other embodiments, the leg assemblies pass around each other. In typical embodiments, the load is statically or dynamically supported by a first leg assembly throughout the movement of a second leg assembly, and vice-versa.

In embodiments where leg assemblies pass through each other, a first leg assembly is coupled to a first track of the beam assembly and a second leg is coupled to a second track of the beam assembly, typically above the first track. The first leg assembly, being narrower than the second leg assembly, can pass between the legs of the second leg assembly and the legs of the second leg assembly can pass outside of the first leg assembly.

In embodiments where leg assemblies pass around each other, part of a first leg assembly is reconfigured such that the legs of the first assembly can move to one side in order to pass by the legs of the second assembly and vice-versa. Therefore, instead of passing through, the legs of the first and second assembly pass around each other during locomotion.

The ambulatory vehicle has a movable center of gravity due, in part, to an ability to shift the load along the beam assembly. For example, in embodiments configured for continuously stable movement of a load over terrain, at one point, the load and the vehicle's center of gravity may be equally supported by both leg assemblies, which are near the opposite ends of the beam assembly. The load and the vehicle's center of gravity then shift until the load is slightly forward of leading first leg assembly, such that the vehicle's center of gravity is solely supported by the leading first leg assembly. Next, because the vehicle's weight is not supported by the trailing second leg assembly, the trailing second leg assembly can be retracted. The beam assembly and the trailing second leg assembly then move forward while the load optionally moves slightly rearward, such that the vehicle's center of gravity remains supported by the first leg assembly. After the second leg assembly exchanges places with the first leg assembly with respect to their positions on the beam assembly, the second leg assembly, now leading, extends and the load is shifted such that both leg assemblies support the load and the vehicle's center of gravity.

The ambulatory vehicle is optionally configured to remain continuously stable while turning, navigating slopes and uneven terrain, and sideways locomotion. Alternatively, the ambulatory vehicle may be configured for locomotion in which the shifting of the load makes the vehicle no longer continuously stable. Under this condition, dynamic stability is maintained through the vehicle's use of kinetic energy. For example, stability may be maintained through programmed accelerations or decelerations of vehicle components that produce desired force(s), which allow the vehicle to maintain balance. These modes of locomotion include striding, trotting, and bounding as described further herein.

Various embodiments of the invention include 1 an ambulatory system comprising a beam assembly comprising a first track, a second track and a third track, the third track configured to bear a load placed thereon and for the load to shift along a length of the beam assembly, a first leg assembly coupled to the first track of the beam assembly, the first leg assembly configured to support the beam assembly and move along the length of the beam assembly, and a second leg assembly coupled to the second track of the beam assembly, the second leg assembly configured to support the beam assembly, move along the length of the beam assembly, and exchange places along the length of the beam assembly with the first leg assembly.

Various embodiments of the invention include a method for transporting a load using an ambulatory vehicle, the method comprising shifting a load disposed on a first track of a beam assembly over a first leg assembly, such that a center of gravity of the ambulatory vehicle is supported by the first leg assembly, retracting a second leg included in a second leg assembly, shifting the load, the beam assembly and/or the second leg assembly such that the center of gravity remains over the first leg assembly, and the second leg assembly exchanges places along the length of the beam assembly with the first leg assembly and extending the second leg assembly.

Various embodiments of the invention include an ambulatory system, comprising a beam assembly comprising a first track, a second track and a third track, the third track configured to bear a load placed thereon and for the load to shift along a length of the beam assembly, a first leg assembly comprising a first leg, the first leg assembly coupled to the first track of the beam assembly and configured to support the beam assembly and move along the length of the beam assembly, and a second leg assembly comprising a second leg, the second leg assembly coupled to the second track of the beam assembly and configured to support the beam assembly and move along the length of the beam assembly, the second leg assembly configured to pass around or pass through or outside the first leg, the first leg assembly configured to pass outside or pass through a second leg assembly.

DETAILED DESCRIPTION OF THE DRAWINGS

FIG. 2A is a rear view of the various embodiments of the pass through ambulatory vehicle, according to various embodiments of the invention.

FIG. 2B is a top view of the various embodiments of the pass through ambulatory vehicle, according to various embodiments of the invention.

FIGS. 6A through 6I depict side views and/or rear views of a series of steps used to execute a turning movement, according to various embodiments of the invention.

FIGS. 7A through 7L depict side views of a series of steps used to move up a set of stairs, according to various embodiments of the invention.

FIGS. 8A through 8K depict top views of a series of steps used in to navigate sideways, according to various embodiments of the invention.

FIGS. 9A through 9I depict side views of a series of steps used in striding, according to various embodiments of the invention.

FIGS. 10A through 10H depict side views of a series of steps used in trotting, according to various embodiments of the invention.

DETAILED DESCRIPTION

The present embodiments provide for an ambulatory vehicle configured to support a load on a beam assembly while transporting the load from a first location to a second location. The load typically contains the vehicle's energy storage, computer, data storage, control mechanisms, sensors, freight (if any), and passengers (if any). In one phase of locomotion, the vehicle is configured for the load to shift on a first track such that the load is supported by a first leg assembly and/or a second leg assembly such that the center of gravity of the ambulatory vehicle is either between the two leg assemblies, or approximately over a supporting leg assembly. In a second phase of locomotion, the vehicle is configured for the load to shift on a first track such that the center of gravity of the ambulatory vehicle is solely supported by a first leg assembly while a second leg assembly exchanges places with the first leg assembly along the length of the beam assembly. The second leg assembly may be configured to pass through or around the first leg assembly, and vice-versa, e.g., the first leg assembly may be configured to pass outside of or around the second leg assembly.

Figure 1:
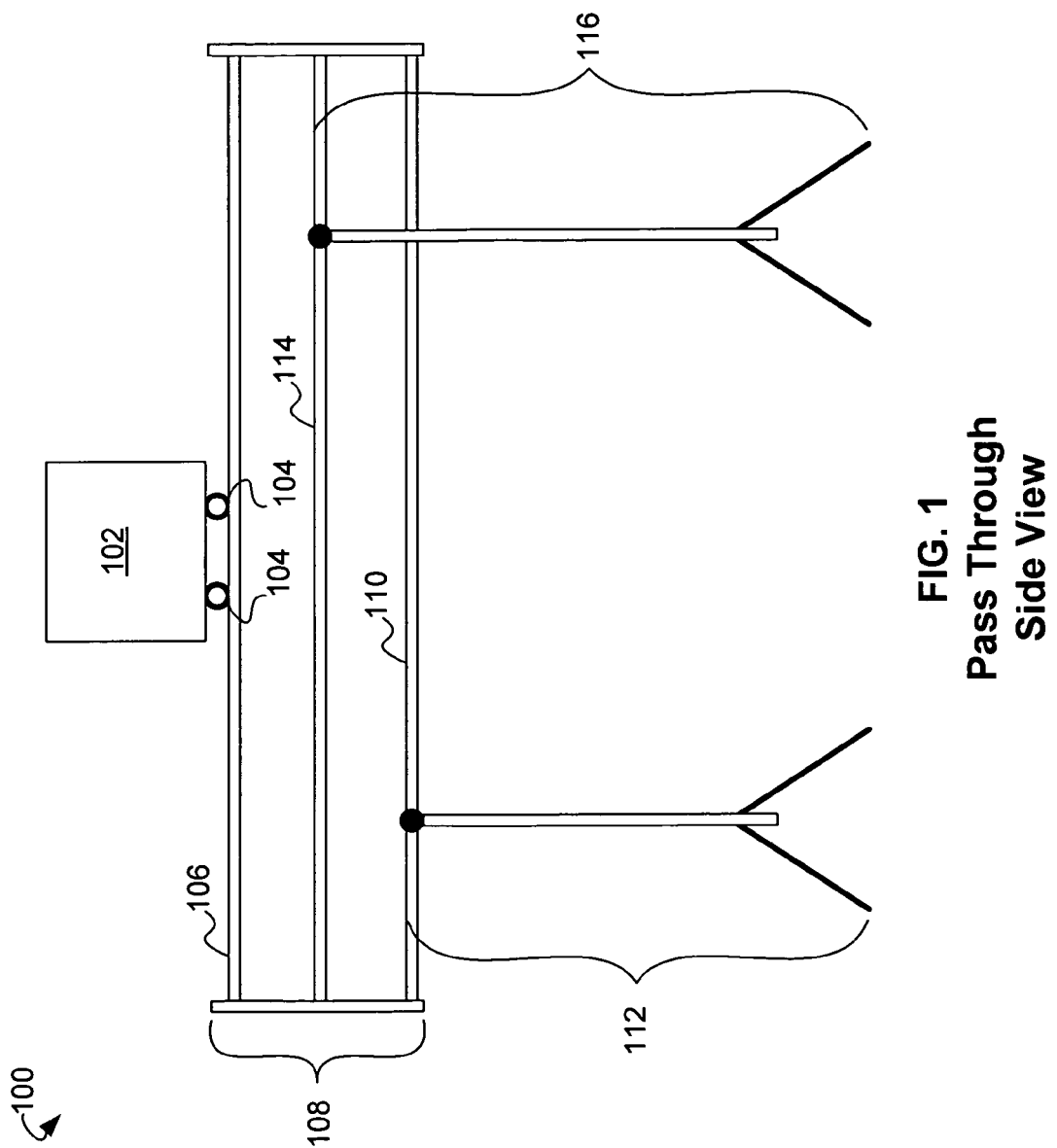
FIG. 1 is a side view of various embodiments of a pass through ambulatory vehicle, according to various embodiments of the invention.

FIGS. 1, 2A and 2B depict various embodiments in which a load is configured to shift on rollers along a beam assembly supported by a first leg assembly and a second leg assembly such that the vehicle's center of gravity is between the two leg assemblies or directly over one of the two leg assemblies. In alternative embodiments, rollers 104 may be replaced by slide rails, bearings, air bearings, magnetic bearings, gears, chains, or the like.

FIGS. 4C through 4I depict various embodiments in which the first leg assembly passes through a second leg assembly. In these embodiments, the first leg assembly is configured to exchange places with the second leg assembly while the load, substantially supported by the second leg assembly, slightly shifts on the beam assembly to maintain a center of gravity over the second leg assembly, and vice-versa.

FIG. 1 illustrates a side view of an ambulatory vehicle 100 in which the first leg assembly 112 is configured to pass through a second leg assembly 116. A load 102 is configured to shift on rollers 104 along a length of a third track 106 of a beam assembly 108 to maintain the center of gravity of the ambulatory vehicle 100 over a second leg assembly 116. A first track 110 of the beam assembly is coupled to a first leg assembly 112. The first leg assembly 112 is configured to independently support the load 102 and the beam assembly 108. The first leg assembly 112 is further configured to retract and shift along the length of the first track 110 when exchanging places along the length of the beam assembly 108 with a second leg assembly 116.

The second leg assembly 116 is coupled to a second track 114 of the beam assembly 108. The second leg assembly 116 is configured to independently support the load 102 and the beam assembly 108. The second leg assembly 116 is further configured to retract and shift along the length of the second track 114 when exchanging places along the length of the beam assembly 108 with the first leg assembly 112.

Generally, the support of the ambulatory vehicle 100 by only the first leg assembly 112 or only the second leg assembly 116 can be either static or dynamic. For example, in gaits using static support, when the center of gravity is substantially centered over the first leg assembly 112 or the second leg assembly 116, the respective leg assembly is then stationary with respect to the travel surface. In gaits using dynamic support, as is discussed elsewhere herein, the load 102 is supported in part by the kinetic energy of the ambulatory vehicle 100.

FIG. 2A depicts a rear view of the ambulatory vehicle 100. The load 102 is placed on rollers 104 on the third track 106 of the beam assembly 108. The first leg assembly 112 is narrower than the second leg assembly 116. This difference in width permits the first leg assembly 112 to pass through the second leg assembly 116 when the ambulatory vehicle 100 is in motion. The first leg assembly 112 comprises a first upper traverse 202, an axle 204, a gimbal joint 206, a first lower traverse 208, at least two legs 210 configured to move relative to the first lower traverse 208, and, optionally, two sets of feet 212 disposed at an end of the two legs 210 and configured to contact a travel surface.

The first upper traverse 202 is configured to move the rest of first leg assembly 112 along the length of the first track 110. The first upper traverse connects to the rest of the first leg assembly via the axle 204, which comprises the vertical axis of gimbal joint 206. The gimbal joint 206 is configured to allow rotation of the first upper traverse 202 and therefore the beam assembly 108 around both a typically vertical axis for turning and a typically horizontal axis for navigating slopes or obstacles. The first legs 210 may orient away from the vertical as required for static stability or for a dynamic gait. If the first legs 210 are under load, the first legs 210 can quickly retract, orient away from the vertical, and/or extend to provide support, as required to maintain an upright position of the ambulatory vehicle 100 while responding to an extraneous force, such as an impact, from any direction. The first lower traverse 208, the axle 204, and the gimbal joint 206, are configured to allow a second lower traverse 220, of the second leg assembly 116, to pass over the first legs 210. In some embodiments, the first lower traverse 208 is coupled to the first legs 210 in such a way as to allow the first legs 210 to retract from a travel surface. In embodiments not comprising the optional feet 212, each of the first leg assembly 112 and the second leg assembly 116 optionally include three or more legs configured to make direct contact with the travel surface.

The feet 212, coupled to the first legs 210, are configured to make contact with the travel surface and to stabilize the ambulatory vehicle 100 during movement. The feet 212 may lock into position when the first leg assembly 112 is statically supporting the load 102, as shown in FIG. 1.

The second leg assembly 116 also supports the beam assembly 108 and the load 102, and is substantially similar to the first leg assembly 112. Like the first leg assembly 112, the second leg assembly 116 comprises a second upper traverse 214, an axle 216, a gimbal mount 218, a second lower traverse 220, at least two second legs 222 configured to move relative to the second upper traverse 214, and, optionally, two sets of feet 212 disposed at an end of the two legs 220 and configured to contact a travel surface.

In various embodiments, first legs 210 and second legs 222 are configured to extend and retract from a travel surface by rotating, rising, and/or telescoping. In some embodiments, these legs are configured to lock at various lengths in order to accommodate unevenness in terrain. This locking is optionally configured to hold the first lower traverse 208 and/or the second lower traverse 220 in approximately a horizontal position. For example, while examples illustrated herein sometimes illustrate legs rising from a travel surface without changing length, it is contemplated that in many cases the legs will be retracted by telescoping and/or rotating instead.

The second leg assembly 116 typically differs from the first leg assembly 112 in at least three ways. First, the second upper traverse 214 is coupled to a second track 114 of the beam assembly 108. In the embodiments shown, the second track 114 is immediately above the first track 110, although this is not a requirement. Second, the second lower traverse 220 is longer than the first lower traverse 208. This difference in length positions the second legs 222 further apart than the first legs 210 to allow the first leg assembly 112 to pass between (through) the second legs 222. Third, the second legs 222 are longer than the first legs 210 due to the difference in height from the travel surface to the second track 114 relative to the height from the travel surface to the first track 110.

In FIG. 2B, a top view of the ambulatory vehicle 100 is depicted. The load 102 is placed on the third track 106 of the beam assembly 108. The first leg assembly 112 comprises the first lower traverse 208 that is shorter than the second lower traverse 220 of the second leg assembly 116. This difference in length permits the first leg assembly 112 to pass through the second legs 220 of the second leg assembly 116. In various embodiments, the first track 110, the second track 114 and the third track 106 of the beam assembly 108 may be configured to extend using telescoping. In these embodiments, the rollers 104, the first leg assembly 112, and the second leg assembly 116 are configured are modified to accommodate the varying length of the beam assembly 108 throughout locomotion.

Figure 3:
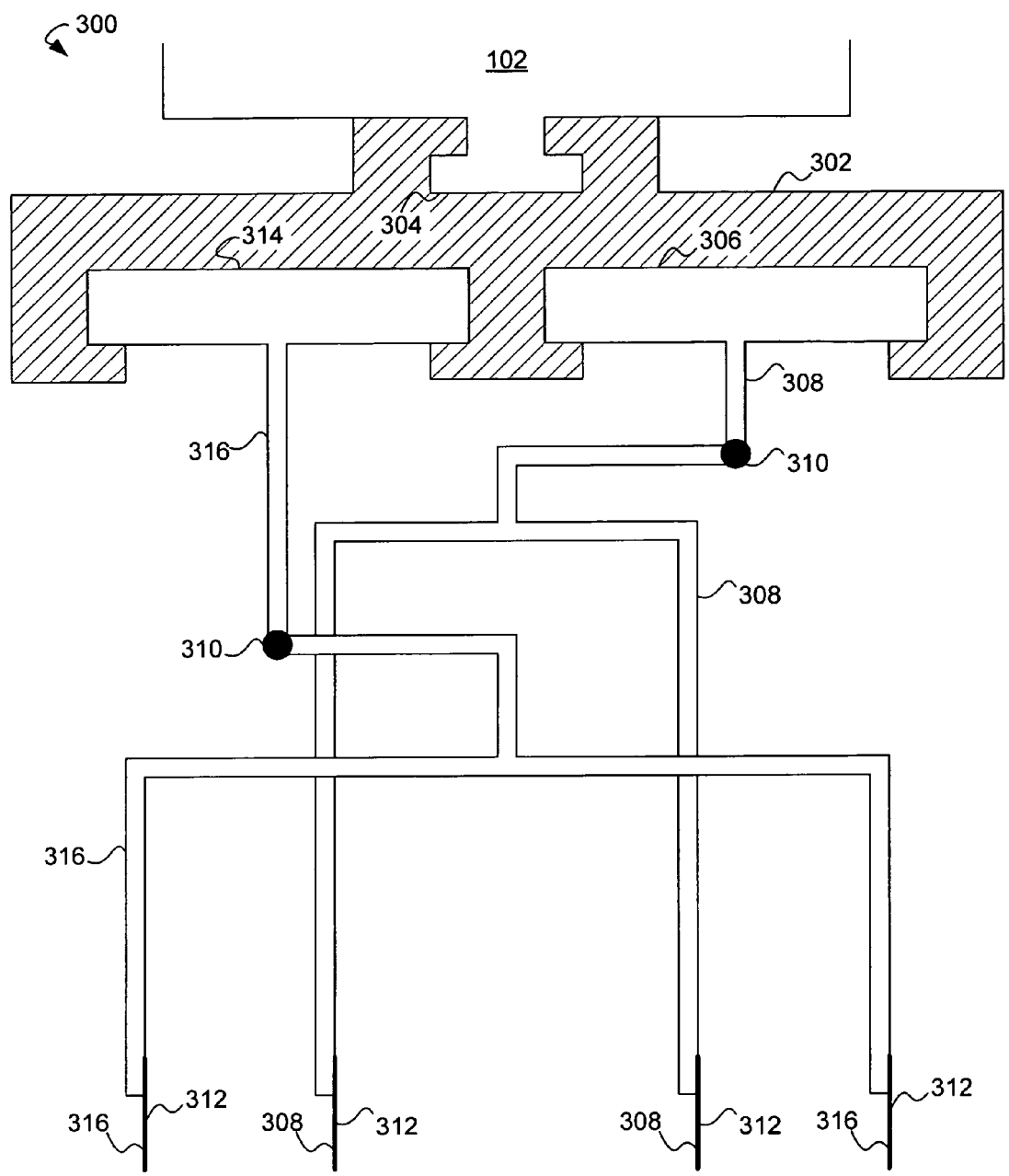
FIG. 3 is a rear view of various embodiments of a pass around ambulatory vehicle, according to various embodiments of the invention.

FIG. 3 depicts various embodiments of an ambulatory vehicle 300 configured to transport a load 102 from a first location to a second location along a travel surface. The ambulatory vehicle 300 comprises a central assembly 302 and two or more leg assemblies 308 and 316. The central assembly 302 comprises a load rail 304, a first leg rail 306, and a second leg rail 314. The load rail 304 is configured to allow a load 102 to shift along a length of the central assembly 302 to maintain the center of gravity of the ambulatory vehicle 300.

The first leg assembly 308 and the second leg assembly 316 function in similar manners during locomotion and may have nearly identical stances. Both leg assemblies are configured to independently support the ambulatory vehicle 300, either statically or dynamically and retract or extend during locomotion. In the depicted embodiment, the first leg rail 306 is in the same horizontal plane as the second leg rail 314. In alternative embodiments, the first leg rail 306 and the second leg rail 314 may be vertically offset to decrease the overall width of the ambulatory vehicle 300. The following description applies equally to the first leg assembly 308 and the second leg assembly 316.

The first leg assembly 308 includes a first gimbal joint 310 and optional feet 312. The first leg assembly 308 is fit into the first leg rail 306 for moving along the length of the central assembly 302. The first gimbal joint 310 is located below the first leg rail 306 and is configured to rotate around a vertical and/or horizontal axis. Rotation around the vertical axis allows the first leg assembly 308 to rotate around the second leg assembly 316. Below the first gimbal joint 310, the first leg assembly 308 includes features configured for supporting the load 102 and the central assembly 302. For example, the first leg assembly 308 further includes two sets of optional feet 312. Like the "pass through" embodiments (e.g., those embodiments illustrated by the ambulatory vehicle 100), the feet 312 are configured to contact the travel surface and provide stability. As in the "pass through" embodiments, the legs in the "pass around" version may retract, for example by telescoping.

FIGS. 4 through 11 and their respective subfigures represent various modes of locomotion that may be performed by the "pass through" embodiments of the ambulatory vehicle, e.g., ambulatory vehicle 100 in which a first leg assembly 112 is configured to pass through the second legs 222 of the second leg assembly 116. The steps illustrated in each of these figures may be modified to provide locomotion of the "pass around" embodiments (e.g., those embodiments illustrated by ambulatory vehicle 300). FIGS. 4 and 5 continuously stable locomotion along a substantially flat travel surface. FIG. 6 depicts a movement used to turn the ambulatory vehicle 100. FIG. 7 depicts stable movement up a set of stairs. FIG. 8 depicts a gait for traveling in a sideways manner that may be used for climbing or descending slopes.

FIGS. 9 through 11 depict dynamic gaits that utilize kinetic energy and, unlike continuously stable locomotion, rely on kinetic energy to achieve stability. FIG. 9 depicts a striding gait. FIG. 10 depicts a trotting gait. FIG. 11 depicts a bounding gait.

FIGS. 4A through 4L and FIGS. 5A through 5L depict a sequence of movements used by the pass through embodiments, e.g., ambulatory vehicle 100, during walking locomotion along a substantially flat travel surface. The locomotion is appropriate for, for example, rough terrain, areas that require tight maneuvering, and/or fragile terrain. While walking, the ambulatory vehicle 100 remains statically stable, i.e., the ambulatory vehicle 100 will remain in place and upright if motion is suddenly stopped or no longer possible. For each step, a side view of the ambulatory vehicle 100 followed by a top view of the same step are shown. In these figures, the direction of travel or locomotion is directed to the right of the page.

During walking, the load 102 shifts to maintain a center of gravity over the first leg assembly 112 while the second leg assembly 116 and the beam assembly 108 shift in the direction of travel. FIGS. 4A through 4L depict the sequence of movements performed by the ambulatory vehicle 100 while the second leg assembly 116 acts as the supporting leg assembly and the first leg assembly 112 is moved. In this embodiment, the first leg assembly 112 passes through the second leg assembly 116.

Figures 4A, 4B, 4C, 4D:
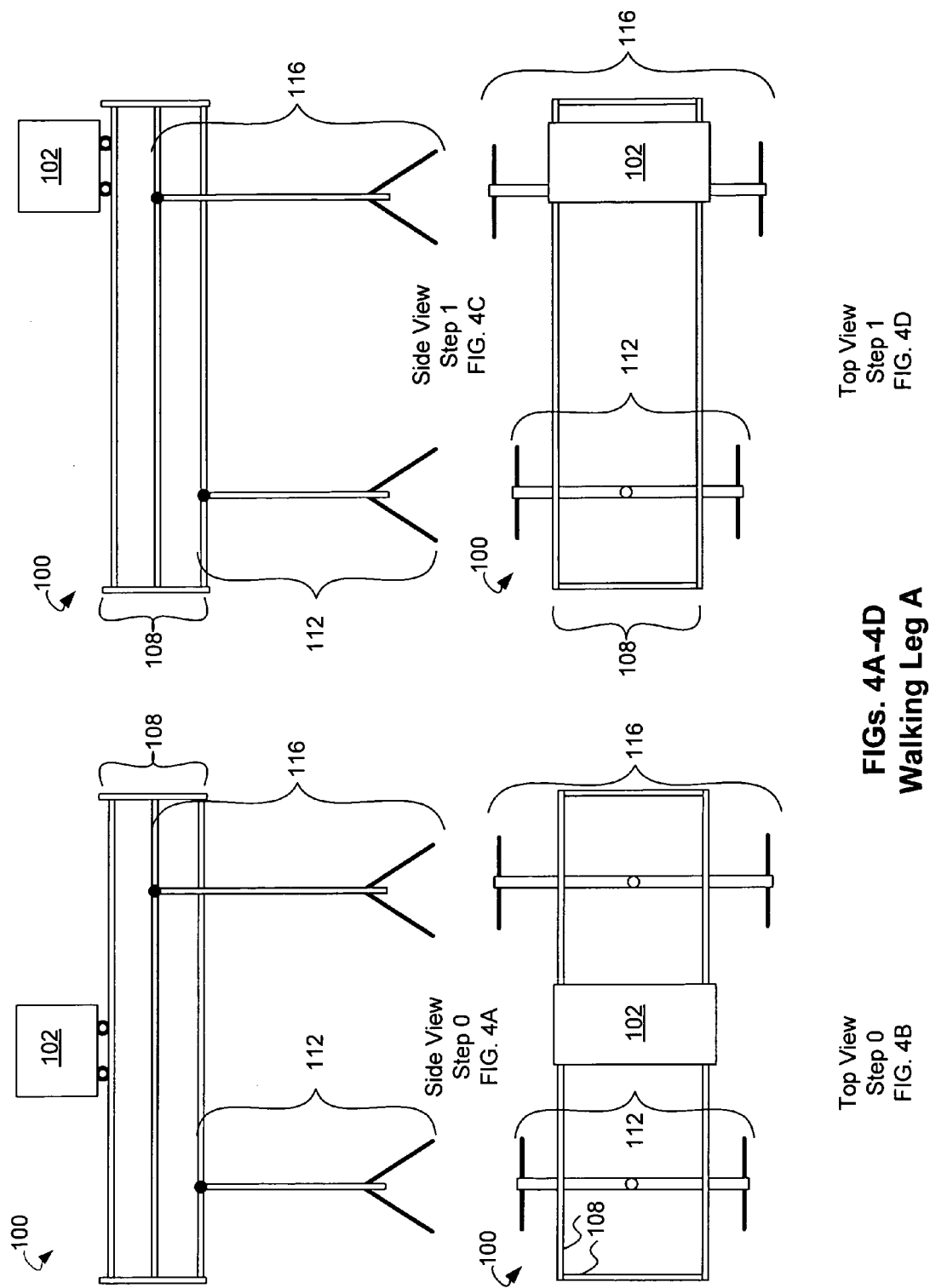
FIGS. 4A through 4L depict side views and top views of a series of steps used in walking locomotion in which a second leg assembly remains stationary, according to various embodiments of the invention.
Figures 5A, 5B, 5C, 5D:
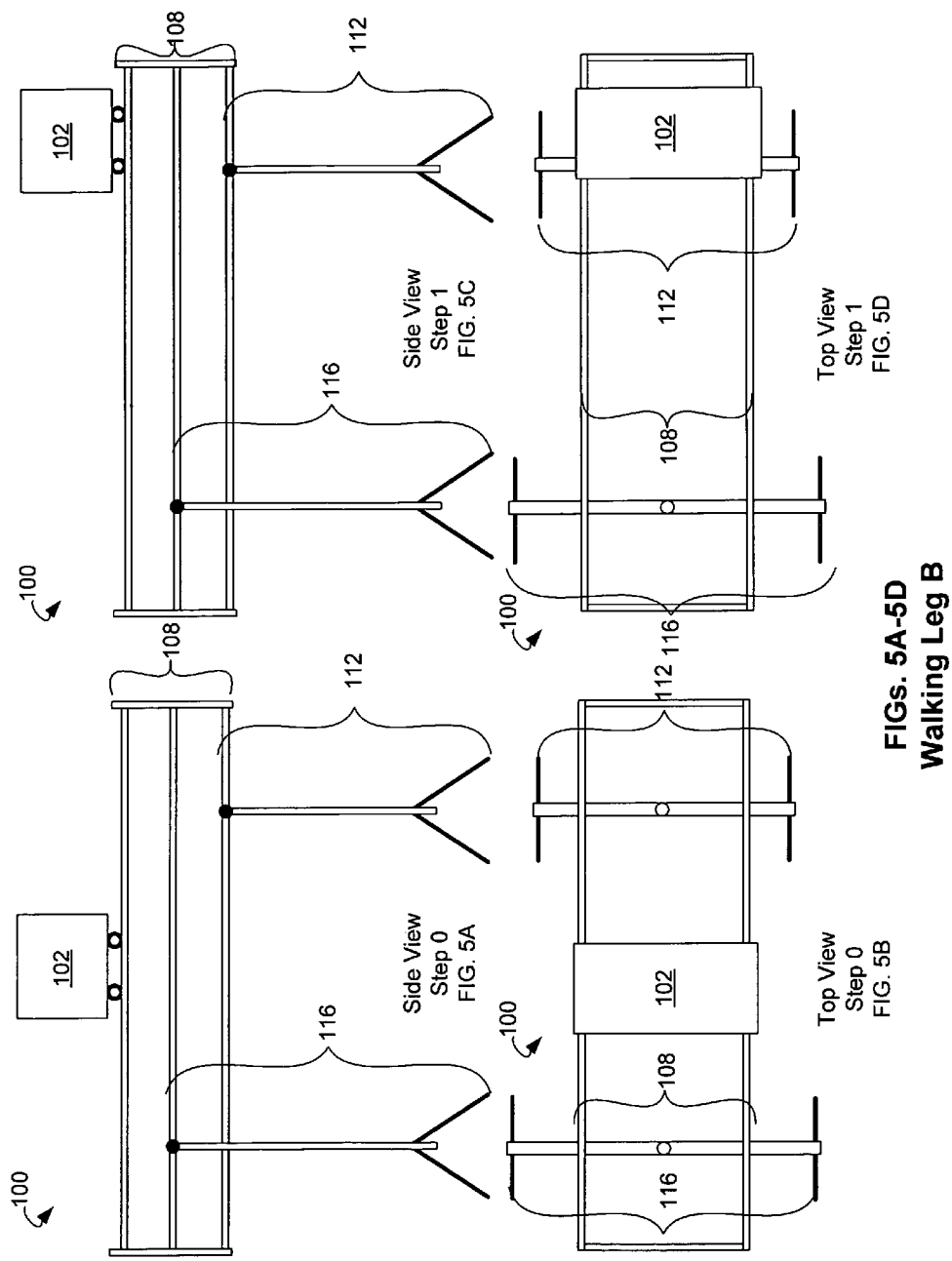
FIGS. 5A through 5L depict side views and top views of a series of steps used in walking locomotion in which a first leg assembly remains stationary, according to various embodiments of the invention.
Figures 5E, 5F, 5G, 5H:
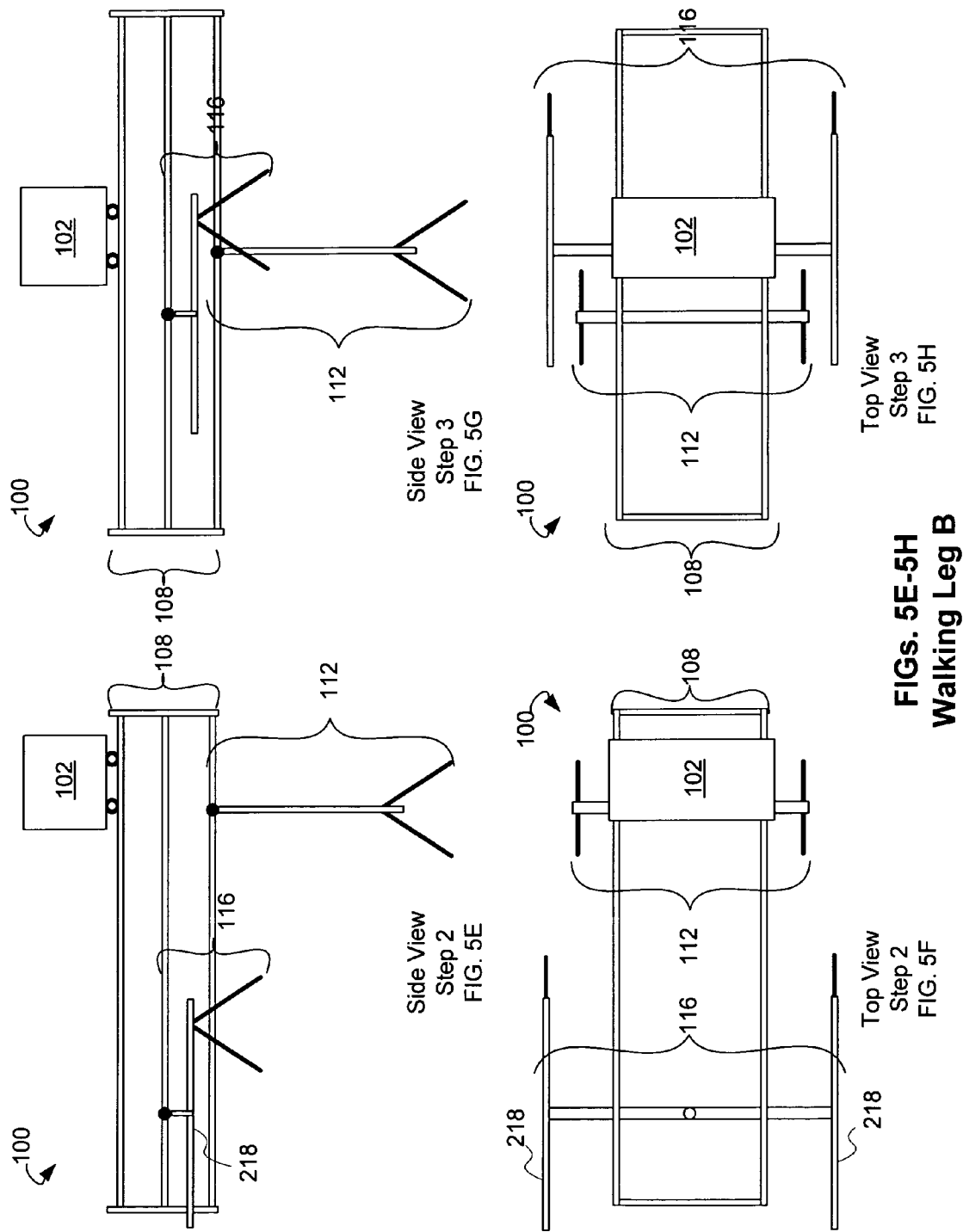

FIGS. 4A and 4B depict a starting position, step zero, in which the first leg assembly 112 and the second leg assembly 116 are both supporting the beam assembly 108 and the load 102. In this example, the load 102 is depicted as being approximately centered on the beam assembly. The first leg assembly 112 is located along the beam assembly 108 in a rearward position with respect to the direction of travel.

FIGS. 4C and 4D depict a step one of the continuously stable locomotion. In this step, the load 102 shifts on the beam assembly 108 to a location that is substantially over the second leg assembly 116. The location on the third track 106 is determined such that the center of gravity of the load 102, the beam assembly 108 and the first leg assembly 112 is over the second leg assembly 102, which supports the ambulatory transport system 100. The first leg assembly 112 is therefore not required to support any significant amount of mass. The best position for the load is dependent on its weight relative to the rest of the vehicle.

Figures 4E, 4F, 4G, 4H:
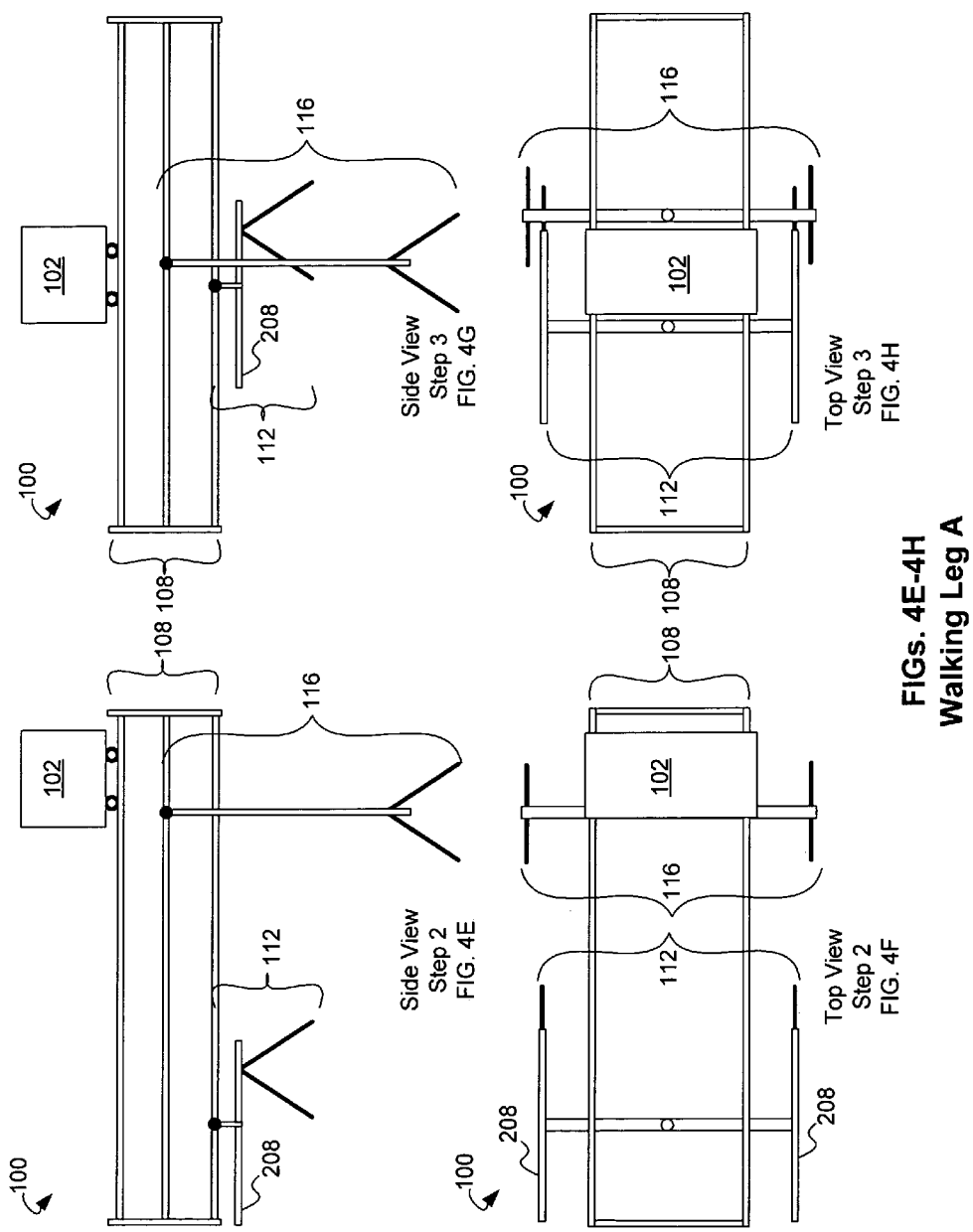

FIGS. 4E and 4F depict a step two of the statically stable locomotion, in which the first leg assembly 112 is retracted above the travel surface. In some embodiments, the first leg assembly 112 may rotate ninety degrees such that it is substantially parallel to the travel surface, however, any amount of rotation sufficient to clear the first leg assembly 112 from the travel surface may be used. Alternatively, the first leg 208 of the first leg assembly 112 may rise vertically rather than or in addition to rotation to clear the travel surface. In these embodiments, the first leg 208 may be configured to telescope. In the embodiment shown, for example, the first leg 208 is retracted approximately half its length above the travel surface and rotated about ninety degrees into position.

FIGS. 4G and 4H depict a step three of the continuously stable locomotion. In step three, the beam assembly 108 and the first leg assembly 112 shift in the direction of travel while the second leg assembly 116 supports the load 102, the beam assembly 108, and the first leg assembly 112. The second leg assembly 116 remains stationary with respect to the travel surface throughout this movement. The load 102 optionally shifts as needed along the length of the beam assembly 108 to maintain a center of gravity over the second leg assembly 112 while the beam assembly 108 and the first leg assembly 112 optionally shift a distance in the direction of travel approximately equal to a the length of the beam assembly 108. As shown in FIG. 4H, the first leg assembly 112 passes through or between the second leg assembly 112 approximately halfway through the shifting.

Figures 4I, 4J, 4K, 4L:
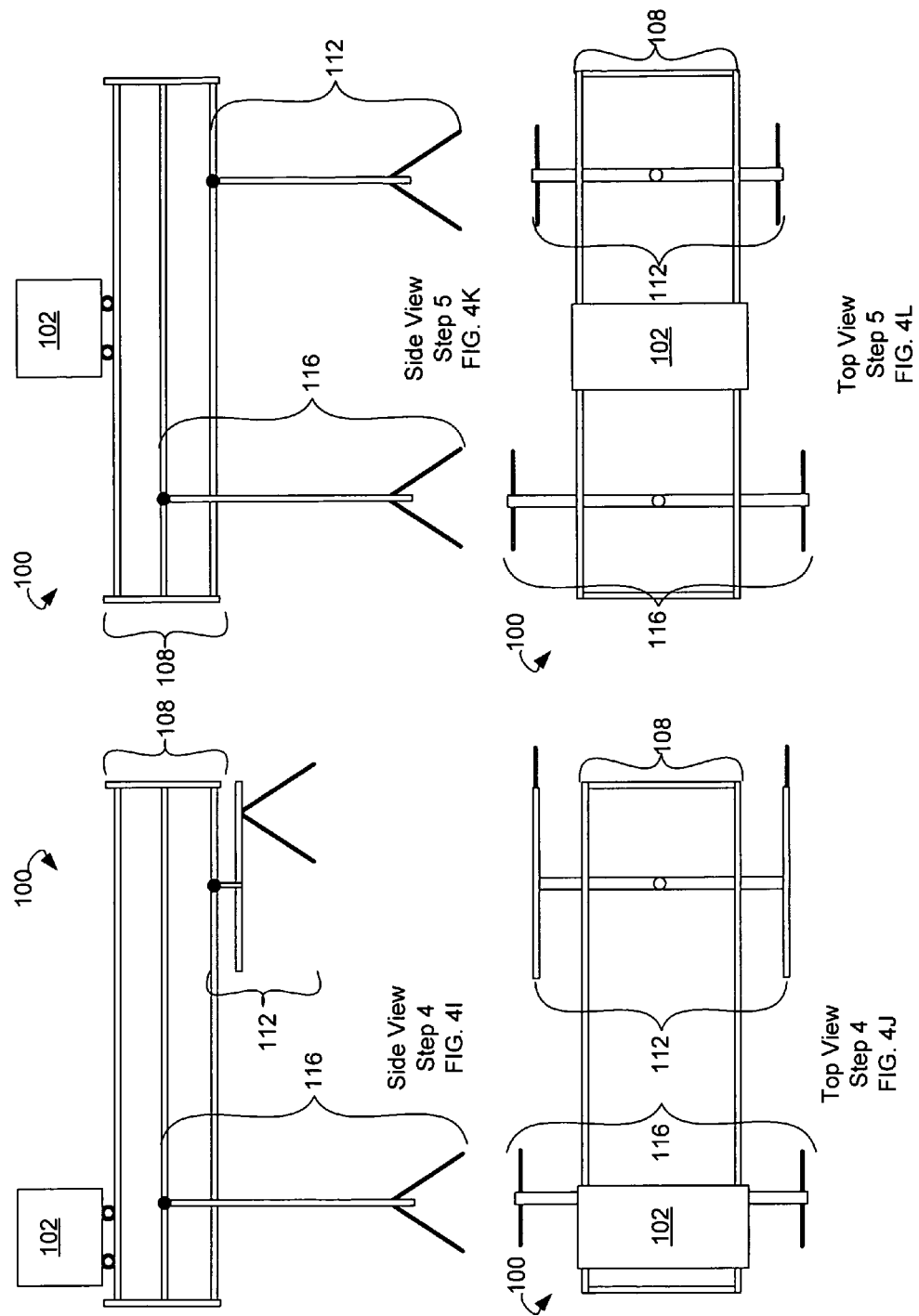

FIGS. 4I and 4J depict a step four of the continuously stable locomotion. This step occurs at the end of step three when the first leg assembly 112 and the beam assembly 116 have reached a final position along the travel surface. The first leg assembly 112 has exchanged places along the length of the beam assembly 108, now being in a forward position relative to the direction of travel. In this step, the second leg assembly 116 is still supporting the ambulatory vehicle 100. The first leg assembly 112, in a reverse of step two, rotates and/or extends to the travel surface.

FIGS. 4K and 4L depict a step five of the continuously stable locomotion. In this last step, the load 102 and the beam assembly 108 is supported by both the first leg assembly 112 and the second leg assembly 116. The load 102 is therefore able to shift back into a central position on the beam assembly. It should be noted that step five may occur as a transitory step between movements in a series of walking steps and that the load 102 may be located anywhere along the length of the beam assembly 108.

FIGS. 5A through 5L depict the continuously stable gait of the ambulatory transport 100 in which the first leg assembly 112 supports the ambulatory vehicle 100 while the second leg assembly 116 moves along the length of the beam assembly 108. In this gait, second leg assembly 116 begins in the rearward position while the first leg assembly 112 is initially in the forward position and the second leg assembly 116 passes over the first leg assembly 112 while moving forward to exchange places with the first leg assembly 112. Like FIGS. 4A through 4L, the top view of the step is located below the side view on the figure sheet and is lettered subsequently to the side view. In these figures, the direction of travel or locomotion is to the right of the page.

FIGS. 6A through 6E depict a turning movement into the plane of the page by the ambulatory vehicle 100 during continuously stable locomotion. In these figures, travel is directed towards the right of the drawing sheet while the turning movement is directed into the plane of the drawing sheet. FIGS. 6A through 6E include side views of the first four steps. Steps five and six are depicted in FIGS. 6F through 6I in both side and front views. The third step is optional.

FIGS. 6A through 6D are substantially similar to steps zero through three of the continuously stable locomotion as depicted in FIGS. 5A through 5H. It should be noted that in FIG. 6D the load 102, the beam assembly 108, and the second leg assembly 116 are substantially centered over the first leg assembly 112, which is the supporting leg assembly.

FIG. 6E depicts the side view of the ambulatory vehicle 100 after a ninety degree rotation into the plane of the page which is step four. The rotation about the vertical axis is achieved using the gimbal joint 206 of the first leg assembly 112. The first leg 208 and first feet 210 remain stationary with respect to the travel surface throughout the rotation to support the load 102, the beam assembly 108, and the second leg assembly 116. It is understood that the rotation is not limited with respect to direction or magnitude.

FIGS. 6F and 6G depict a step five of the turn during continuously stable locomotion. The beam assembly 108 and the second leg assembly 116 shift, as shown, such that the first leg assembly 112 and the second leg assembly 116 have exchanged positions. In some instances, it may be desirable to not have the leg assemblies exchange positions or for the second leg assembly 116 to not shift along the beam assembly 108, such as in areas requiring tight maneuvering. The load 102 continues to shift along the length of the beam assembly 108 to maintain a center of gravity over the first leg assembly 112.

FIGS. 6H and 6I depict a step six of the turn during continuously stable locomotion after the second leg assembly has been rotated and/or extended to the travel surface. The load 102 is supported by both the first leg assembly 112 and the second leg assembly 116. As an additional optional step (not shown), the load 102 may be shifted over the second leg assembly 116 to allow the first leg assembly 112 to rise and/or rotate above the travel surface. The gimbal joint 206 may then rotate to bring the legs 208 in line with the legs 218.

The turning steps depicted in FIGS. 6A through 6I may be performed while the first leg assembly 112 is moved. In these embodiments, the second leg assembly 116 supports the ambulatory vehicle 100 while the turning steps are performed.

Figures 7A, 7B, 7C:
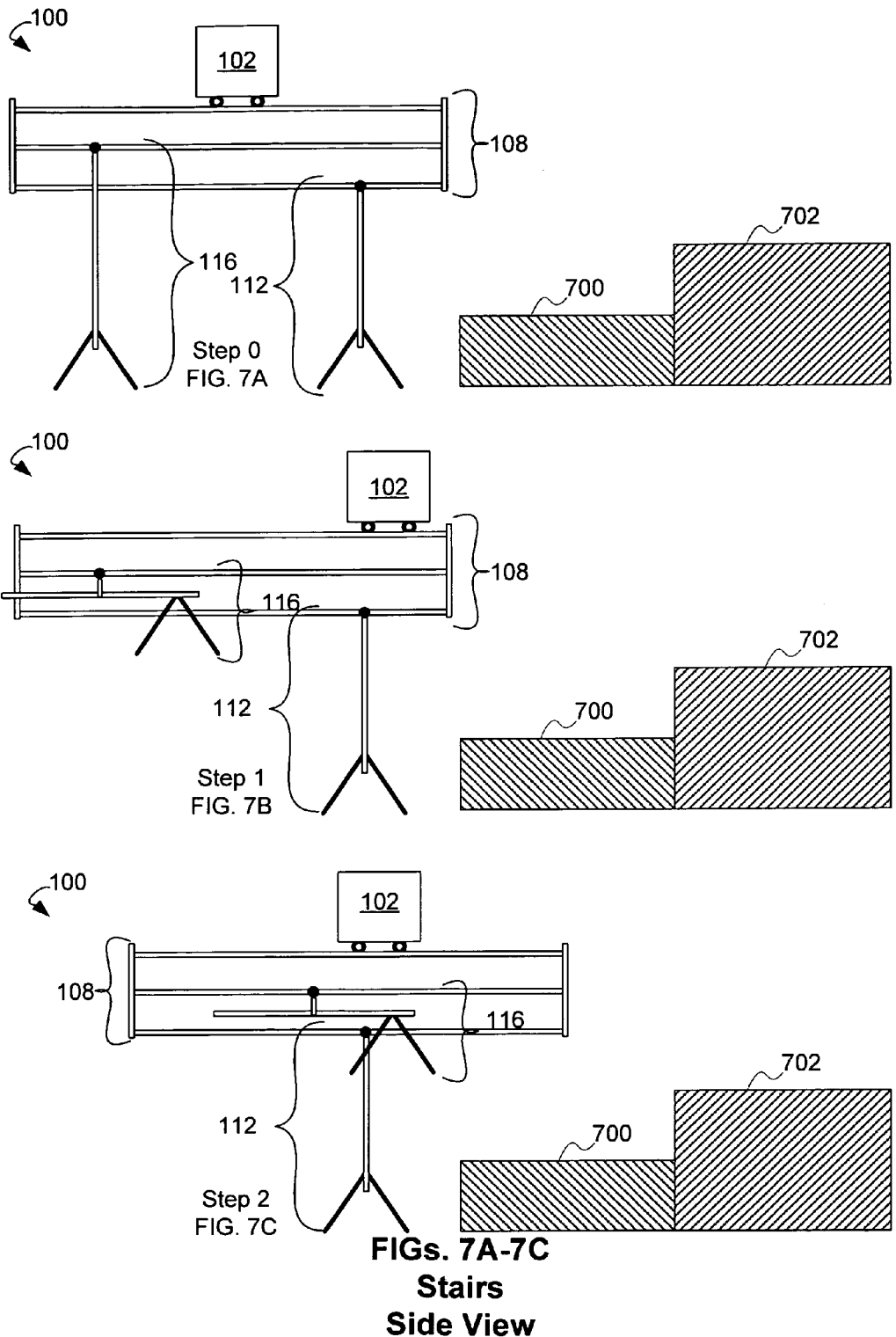
Figures 11A, 11B, 11C, 11D, 11E, 11F, 11G, 11H:
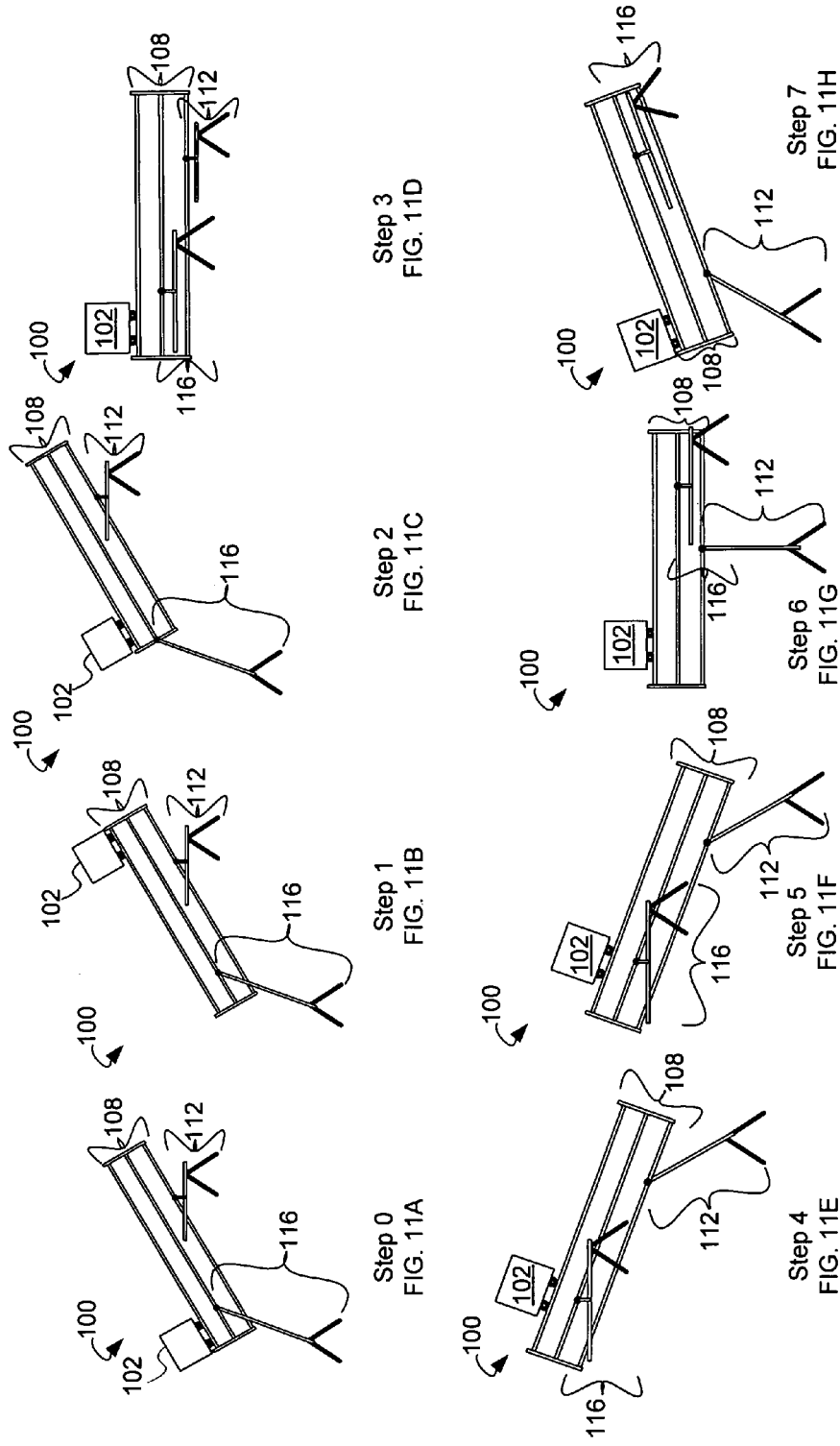
FIGS. 11A through 11H depict side views of a series of steps used in bounding, according to various embodiments of the invention.

FIGS. 7A through 7L depict a series of steps for static movement of the ambulatory vehicle 100 up a set of stairs. The pass around embodiments, e.g. ambulatory vehicle 300, may be configured to navigate a set of stairs in a similar fashion. Additionally, these steps may substantially be performed in reverse to descend a set of stairs. This series of steps is not limited to navigating a set of stairs as these steps may generally be used on sloped, irregular, or inclined surfaces. FIGS. 7A through 7C depict the starting position and the first two steps during which the ambulatory vehicle 100 approaches the step. These figures are similar to the movements depicted in FIGS. 5A through 5H.

Figures 5I, 5J, 5K, 5L:
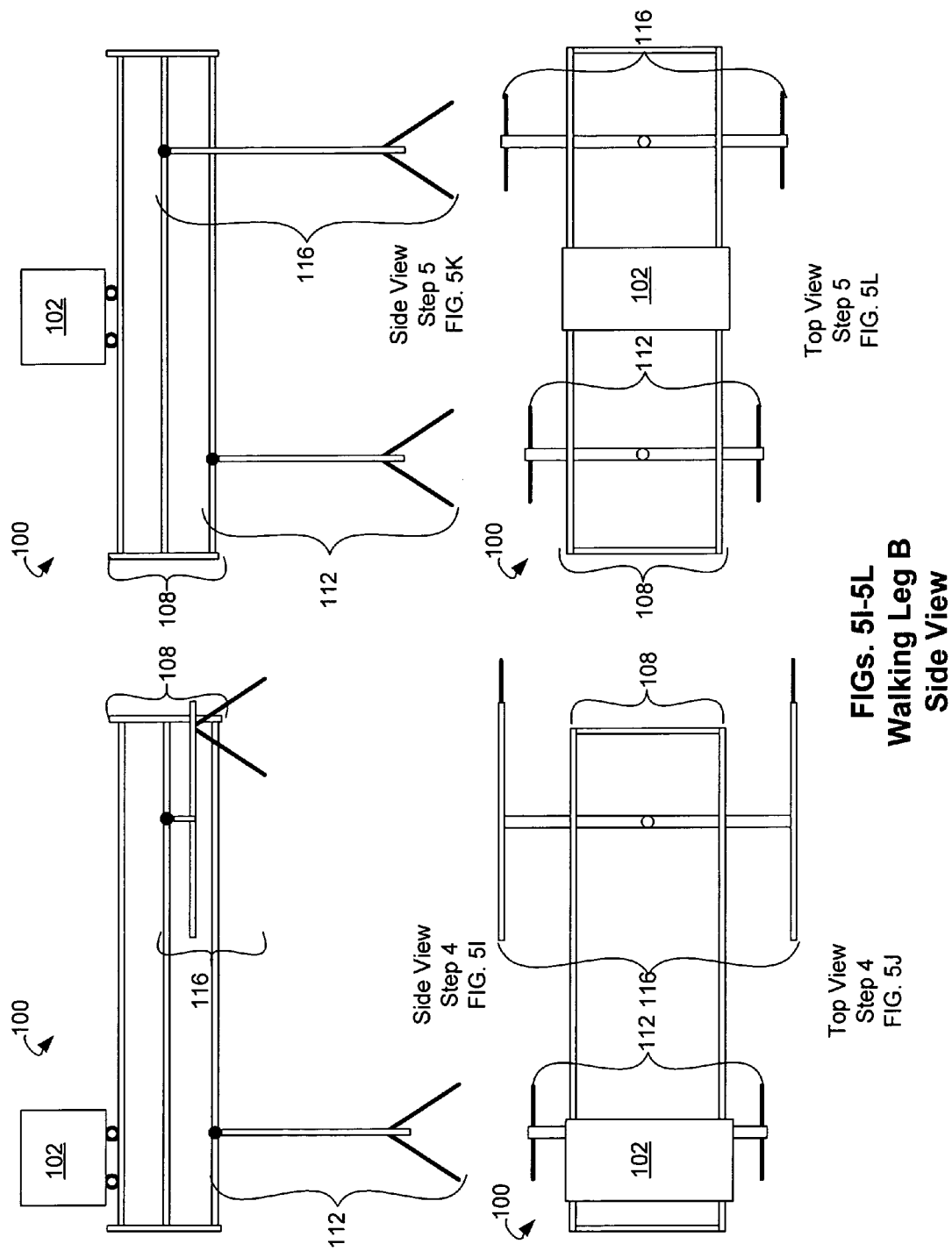

In FIG. 7D, as in FIGS. 5I and 5J, the second leg assembly 116 and the beam assembly 108 have completed shifting with respect to the first leg assembly 112, which has remained stationary with respect to the travel surface. The second leg assembly 116 then extends down to first step 700.

In FIG. 7E, the fourth step in the series of movements, the beam assembly 108 continues to rise on the second leg assembly 116 such that the beam assembly 108 is tilted upwards. To continue stable movements, the load 102, in FIG. 7F, shifts up the inclined beam assembly 108 such that it is substantially supported by the second leg assembly 116, allowing the first leg assembly 112 to rise. To ascend to a second step 702, in FIG. 7G, the first leg assembly rises above the travel surface. In FIG. 7H, the first leg assembly 112 and the beam assembly 116 have shifted with respect to the second leg assembly 116 such that the first leg assembly 112 is over the second step 702.

In FIG. 7I, the eighth step depicted, the first leg assembly 112 has extended to the second stair 702 and the center of gravity is still substantially centered over the second leg assembly 116. In step nine, as depicted in FIG. 7J, the load 102 shifts along the length of the beam assembly 108. The beam assembly 108, like in FIGS. 7E and 7F, is tilted in the direction of travel of the ambulatory vehicle 100. The center of gravity shifts until it is substantially centered over the first leg assembly 112 to allow the second beam assembly 116 to rise. In step ten, depicted in FIG. 7K, the second leg assembly 116 has risen from the first stair 700. It should be noted that the beam assembly 108 may shift during continuously stable locomotion while tilted, as depicted by the embodiment shown in FIGS. 7G and 7H, or alternatively, while substantially horizontal as depicted in FIGS. 7K and 7L. FIG. 7L depicts the ambulatory vehicle 100 on the stairs at the point where the load 102, the beam assembly 108 and the second leg assembly 112 are substantially aligned. At this point, the ambulatory vehicle 100 may execute a turning movement into or out of the page, as depicted in FIGS. 6A through 6I.

FIGS. 8A through 8K depict a series of movements used to climb up or down a steep gradient. In these movements, unlike the previous movements, the first leg assembly 112 and the second leg assembly 116 do not necessarily exchange places with one another during locomotion. FIGS. 8A through 8K are top views of the ambulatory vehicle 100.

FIG. 8A is a top view of the initial position of the ambulatory vehicle 100. This is similar to the starting positions depicted in FIGS. 4A, 5A, 6A, and 7A. In FIG. 8B, step one, the load 102 shifts such as the center of gravity is over the second leg assembly 116. The first leg assembly 112 is then able to rise, as depicted in FIG. 8C. In a step three, as depicted in FIG. 8D, the beam assembly 108, the load 102, and the first leg assembly 112 rotate on the second leg assembly 116. The rotation is typically less than 180 degrees in the direction of travel. In optional step four, as depicted in FIG. 8E, the first leg assembly 112 rotates about the gimbal joint 204 such that it is again substantially parallel to the second leg assembly 116. In FIG. 8F, the first leg assembly 112 extends to the travel surface.

To continue traveling, the ambulatory vehicle 100 repeats the movements depicted in FIGS. 8A through 8F except that the second leg assembly 116 moves while the first leg assembly 112 supports the ambulatory vehicle 100. In FIG. 8G the load 102 shift over the first leg assembly 112 allowing the second leg assembly 116 to rise as depicted in FIG. 8H. In FIG. 8I, the beam assembly 108, the second leg assembly 116 and the load 102 rotate with respect to the first leg assembly 112. As depicted in FIG. 8J, the second leg assembly 116 may rotate back into a position that is substantially parallel to the first leg assembly. In step ten, depicted in FIG. 8K, the second leg assembly 112 extends to the travel surface.

FIGS. 9A through 9I, 10A through 10H, and 11A through 11H depict dynamic gaits that can be performed by the ambulatory vehicle 100. These gaits use kinetic energy created during forward movement to increase the energy efficiency of the ambulatory vehicle 100 and to maintain stability. In the dynamic gaits, turning is performed when one leg assembly is supporting the ambulatory vehicle 100. To turn, the beam assembly 108 rotates around the vertical axis of the gimbal mount of the supporting leg assembly. It is understood that the pass around ambulatory vehicle 300 may also be able to perform these gaits or substantially similar gaits.

FIGS. 9A through 9I depict a striding gait. The striding gait is already underway in FIG. 9A where the second leg assembly 116 is partly supporting the ambulatory vehicle 100 while braking of load 102 and beam assembly 108 also contributes to its support. The first leg assembly 112 is also moving forward. In FIG. 9B the load 102, the first leg assembly 112, and the beam assembly 108 continue to be shifted forward with respect to the travel surface by their remaining kinetic energy such that the first leg assembly 112 exchanges places with the second leg assembly 116, depicted in FIG. 9B. In FIG. 9C, the first leg assembly 112 extends and load 102 begins to accelerate.

FIG. 9D and FIG. 9E depict continuing acceleration of the load 108 forward. In FIG. 9F, braking of load 102 creates a force against beam assembly 108 in the forward direction, which creates enough lifting force on the back end of beam assembly 108 so second leg assembly 116 no longer supports the beam assembly 108 and can be retracted. The force exerted by load 102 from the continued braking is used in step 6, FIG. 9G, to move the beam assembly 108 and the second leg assembly 116 forward with respect to the first leg assembly 112. At the completion of the forward movement, the second leg assembly 116 has exchanged places with the first leg assembly 112, as shown in FIG. 9H. In the final step, FIG. 9I, the second leg assembly 116 extends to the travel surface and load 102 begins accelerating to prepare for the braking which begins as the cycle is repeated.

FIGS. 10A through 10H depict a second dynamic gait referred to herein as trotting, according to various embodiments of the invention. Trotting is similar to striding but includes decelerating load 102 downwards to force the second leg assembly 116 downwards to increase the traction of the second leg assembly 116.

Trotting comprises two phases. FIGS. 10A through 10F depict the first trotting phase and the second trotting phase is depicted in FIGS. 10G and 10H. The phases are nearly identical, except the positions of the first leg assembly 112 and the second leg assembly 116 steps are reversed during the second phase.

During step zero, shown at completion in FIG. 10A, the trotting gait is underway and the load 102 continues the deceleration of a preceding step by braking against the beam assembly 108, which in turn brakes against the supporting second leg assembly 116. The beam assembly 108 continues to rotate counter-clockwise around the horizontal axis of the gimbal mount of supporting second leg assembly 116 while advancing forward with respect to the second leg assembly 116. (Clockwise and counter-clockwise references herein are with respect to motion in the plane of the page.)

During step one, the load 102 is rearward of the second leg assembly 116 and continues the deceleration of step zero in a downward and forward path, and remains at the trailing end of beam assembly 108 at the completion of step one. The retracted first leg assembly 112 moves forward with the beam assembly 108 in the direction of travel.

During step two, the load 102 advances toward the forward end of the beam assembly 108 until a "tipping point" is reached such that the deceleration of the load 102 creates a clockwise moment and the front of the beam assembly 108 begins to tilt toward the travel surface. The first leg assembly 112 shifts to the forward end of the beam assembly 108 and extends toward the travel surface. Just before the first leg assembly 112 contacts the travel surface, the load 102 accelerates to create enough of a counter-clockwise moment so the force exerted by the contact is controlled.

During step three, the ambulatory vehicle 100 is supported by both leg assemblies and the load 102 accelerates forward along the beam assembly 108. During step four, the load 102 brakes to create a clock-wise moment around the feet of the first leg assembly 112, so that the ambulatory vehicle 100 is supported solely by the first leg assembly 112.

During steps 5 and 6, the second leg assembly 116 is retracted and the deceleration of the load 102 decreases to control the descent of the trailing end of the beam assembly 108 and counter-clockwise rotation of the beam assembly 108 around the horizontal axis of the gimbal mount of the first leg assembly 112 until the beam assembly 108 is at a prescribed declination below horizontal.

During step six, the beam assembly 108 and the load 102 continue decelerating and the beam assembly 108 continues rotating counter-clockwise around the horizontal axis of the gimbal mount of the first leg assembly 112 while advancing forward with respect to the first leg assembly 112. At completion, the front end of the beam assembly 108 has a slightly increased front elevation. The load 102, deposed rearward of the first leg assembly 112 throughout this step, continues decelerating in a downward and forward path until reaching the trailing end of the beam assembly 108. The retracted second leg assembly 116 moves forward until reaching the forward end of the beam assembly 108.

The first phase is complete and the second phase has begun as step seven is substantially identical to step one, except that the first leg assembly 112 and the second leg assembly 116 have exchanged places. The ambulatory vehicle 100 can continue dynamic locomotion using steps two through seven, except that the roles of the first leg assembly 112 and the second leg assembly 116 are reversed.

Throughout these phases of locomotion, the movements of auxiliary loads (not shown) may be coordinated with the movements of the other components of the ambulatory vehicle 100 so that the progress of the auxiliary loads during locomotion is smooth and continuous and the utilization of the kinetic energy of each auxiliary load is consistent with that of the other components.

Steering of the ambulatory vehicle 100 is performed when one leg assembly supports the ambulatory vehicle 100 and the beam assembly 108 rotates around the vertical axis of the gimbal mount of the supporting leg assembly. If necessary, the ambulatory vehicle 100 will appropriately tilt toward the inside of a turn, appropriately decreasing the length(s) of the inside leg(s), to handle centrifugal forces generated by the turning movement to maintain stability. Similarly, ascending and descending grades and steps are performed by further rotating the beam assembly 108 around the horizontal axis of the gimbal mount of the supporting leg assembly. Modifications apparent to one skilled in the art of the preceding steps to utilize the generated kinetic energy are required to steer the ambulatory transporter 100 and navigate steps.

FIGS. 11A through 11H depict a bounding gait performed by the ambulatory vehicle 100, according to various embodiments of the invention. There are two phases to bounding vehicle locomotion. FIGS. 11A through 11G depict the steps in bounding phase 1. Only the first step of bounding phase 2 is shown, in FIG. 11H. The phases are nearly identical, except that the positions of the first leg assembly 112 and the second leg assembly 116 are reversed.

During step zero, the beam assembly 108 continues the deceleration of a preceding step while rotating counter-clockwise around the horizontal axis of the gimbal mount of the second leg assembly. The load 102, positioned to the rear of the first leg assembly 112 throughout this step, also continues the deceleration of the preceding step in a downward and forward path and reaches the rear end of the beam assembly 108. The legs of the second leg assembly 116 tilt forward at the top so the feet are nearly under the load 102. As in the preceding step, the retracted first leg assembly 112 is disposed at the forward end of the beam assembly 108. Step zero ends with the start of the acceleration of the load 102 forward and upward on the beam assembly 108, which forces the feet of the second leg assembly onto the terrain and increases their traction. The forward acceleration of the load 102 also exerts a counter-clockwise moment around the horizontal axis of the gimbal mount of the second leg assembly 116 which will somewhat increase the elevation of the beam assembly 108.

Step one is complete when the load 102 has achieved its maximum velocity along the beam assembly 108 and is nearing its forward end. The weight of the load will exert a clockwise moment around the horizontal axis of the gimbal mount of the second leg assembly 116, which will decrease the elevation of the beam assembly 108.

During step two, the second leg assembly 116 rapidly accelerates the ambulatory vehicle 100 upward and forward by acting on the beam assembly 108. Simultaneously, the load 102 utilizing kinetic energy generated in the preceding step, contributes by rapidly accelerating the ambulatory vehicle 100 upward and forward by acting on the beam assembly 108. The forward acceleration of the beam assembly 108 initially exerts a clockwise moment around the horizontal axis of the gimbal mount of the second leg assembly, which will decrease the elevation of the beam assembly 108. The weight of the load 102 will also exert a clockwise moment. These moments will partially reverse the counter-clockwise moment of step zero. As the second leg assembly 116 nears the rear end of the beam assembly 108, it decelerates and comes to rest at the end, as does the load 102 relative to the beam assembly 108. The feet of the second leg assembly 116 leave the terrain surface as the acceleration of the beam assembly 108 completes and the ambulatory vehicle 100 enters a trajectory.

During step three, the second leg assembly 116 retracts and the ambulatory vehicle 100 reaches the apogee of its trajectory.

During step four, the ambulatory vehicle 100 descends towards the end of its trajectory and the first leg assembly 112 extends and tilts forward at the bottom in preparation for landing.

During step five, the first leg assembly 112 contacts the travel surface and begins decelerating the beam assembly 108 by braking on the beam assembly 108. The load 102 begins decelerating by braking on the beam assembly 108.

During step six, the load 102 continues to decelerate while the beam assembly 108 and the retracted second leg assembly 116 accelerate forward, both creating a net clockwise moment around the feet of the first leg assembly 112, whose legs rotate clockwise to a vertical position. The ambulatory vehicle 100 is now supported solely by the first leg assembly 112, without being tilted backwards by the weight of the load 102.

During step seven, the beam assembly 108 continues the deceleration of the preceding step by rotating counter-clockwise around the horizontal axis of the gimbal mount of the first leg assembly 112. The load 102, to the rear of the first leg assembly 112, also continues the deceleration of the preceding step in a downward and forward path until it reaches the rear end of the beam assembly 108. The legs of the first leg assembly 112 tilt forward so the feet are nearly under the load 102. As in the preceding step, the retracted second leg assembly 116 is at the forward end of the beam assembly 108. Step seven ends with the start of the acceleration of the load 102 forward and upward on the beam assembly 108, which forces the feet of the second leg assembly 116 onto the terrain and increases their traction.

At this point, the first phase has been completed and the second phase has started, since the completed step seven is the same as step zero, except that the first leg assembly 112 and the second leg assembly 116 are interchanged. The ambulatory vehicle 100 can continue dynamic locomotion with steps depicted in the first phase, except that the first leg assembly 112 and the second leg assembly 116 are interchanged.

Throughout all phases of locomotion, the movements of auxiliary loads (not shown) may be coordinated with the movements of the other components of the ambulatory vehicle 100 so that the progress of the auxiliary loads during locomotion is smooth and continuous and the utilization of the kinetic energy of each auxiliary load is consistent with that of the other components.

Steering is performed upon takeoff and/or landing when one leg assembly supports the ambulatory vehicle 100 and the beam assembly 108 rotates around the vertical axis of the gimbal mount of the supporting leg assembly. If necessary, the ambulatory vehicle 100 will appropriately tilt toward the inside of a turn to handle centrifugal forces generated by the turning movement to maintain stability. Similarly, ascending and descending grades and steps are performed by further rotating the beam assembly 108 around the horizontal axis of the gimbal mount of the supporting leg assembly. Modifications apparent to one skilled in the art of the preceding steps to utilize the generated kinetic energy are required to steer the ambulatory transporter 100 and navigate steps.

Figure 12A:
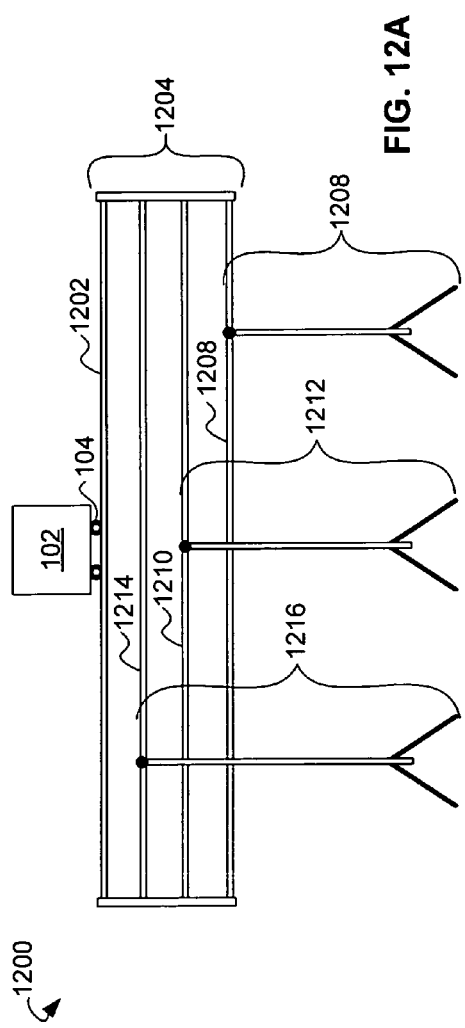
FIGS. 12A through 12B depict side views of various embodiments of three-legged vehicles, according to various embodiments of the invention.
Figure 12B:
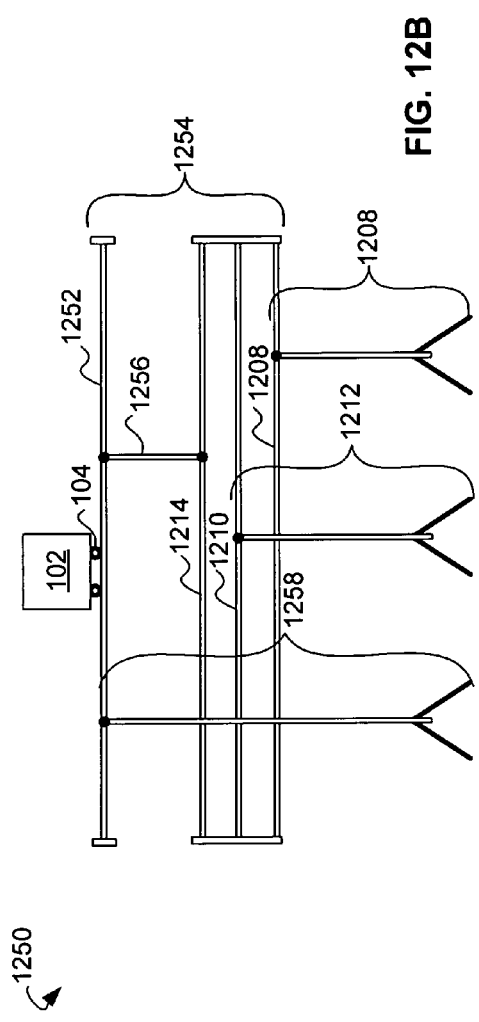

FIGS. 12A and 12B depict various embodiments of a pass through ambulatory vehicle comprising three leg assemblies that are able to exchange places with one another. The third leg assembly may be desirable in embodiments requiring extra stability or an ability to carry heavier loads. In these embodiments, the center of gravity of the vehicle is optionally supported by at least two leg assemblies. The leg assemblies are substantially similar to the first leg assembly 112 and the second leg assembly 116 depicted in FIGS. 2A and 2B. The ambulatory vehicle 1250 comprises an additional support configured to support a load. The ambulatory vehicle 1200 and the ambulatory vehicle 1250 may alternatively comprise leg assemblies that pass around rather than pass through each other while exchanging places along the length of the beam assembly.

FIG. 12A depicts ambulatory vehicle 1200 having a movable center of gravity and comprising a load 102 disposed on rollers 104, the rollers 104 configured to shift along a fourth track 1202 extending a length of a beam assembly 1204. The first leg assembly 1206, the second leg assembly 1212, and the third leg assembly 1216 are substantially similar to each other. For the most part, the descriptions of the first leg assembly 1206 elsewhere herein apply to the second leg assembly 1212 and the third leg assembly 1216.

The first leg assembly 1206 is configured to rise above a travel surface and shift along a first track 1208 of the beam assembly 1204 to exchange places with one or both other leg assemblies. The first leg assembly 1206 may be able to independently support the ambulatory vehicle 1250. Alternatively, the first leg assembly 1206 is configured to support the ambulatory vehicle 1200 together with another leg assembly (i.e., the second leg assembly 1212 or the third leg assembly 1216).

The lower traverse of each leg assembly is configured to allow the other leg assemblies to exchange places along the length on the beam assembly 1204 along their respective tracks. For example, the second leg assembly 1212, configured to shift along the second track 1210, has a wider lower traverse than the first leg assembly 1206, enabling the first leg assembly 1206 to pass through the second leg assembly 1212. Likewise, the third leg assembly 1216, configured to shift along the third track 1214, has the widest lower traverse of the three leg assemblies. Thus, both the first leg assembly 1206 and the second leg assembly 1212 are able to pass through the third leg assembly 1216.

FIG. 12B depicts an ambulatory vehicle 1250 comprising a first leg assembly 1206, a second leg assembly 1212, a third leg assembly 1258 and a support 1256 for the load 102. The load 102 is configured to shift on the rollers 104 along the length of a fourth track 1252 of a beam assembly 1254, to maintain the position of the center of gravity of the ambulatory vehicle 1250. The fourth track 1252 and the load 102 are further supported by support 1256. The support 1256 is configured to shift along the length of the beam assembly between a third track 1214 and the fourth track 1252. The support 1256 may be coupled to the fourth track 1252 and/or the third track 1214 using a gimbal joint. The support 1256 may additionally exchange places with the leg assemblies along the length of the beam assembly during locomotion. The support 1256 is configured to allow the beam assembly 1254, the load 102 and both retracted leg assemblies to rotate during a turn in which the third leg assembly 1258 is one of the retracted leg assemblies.

The third leg assembly 1258 is configured to shift along the fourth track 1252 of the beam assembly 1254 rather than the third track 1214 as discussed in previous embodiments. The first leg assembly 1208 is substantially similar to first leg assembly 1206 of the ambulatory vehicle 1200 and shifts along the first track 1208 of the beam assembly 1254. The second leg assembly 1212 is substantially similar to the second leg assembly 1212 of the ambulatory vehicle 1200 and shifts along the second track 1210 of the beam assembly 1254. As discussed herein, the leg assemblies are configured to exchange places along the length of beam assembly 1254 during locomotion.

FIGS. 13A through 13I depict a side view of a series of steps used by the ambulatory vehicle 1200 during walking locomotion where the direction of travel is to the right of the page. These steps may also be performed by the ambulatory vehicle 1250. Like the walking locomotion depicted in FIGS. 4A through 4L and FIGS. 5A through 5L, the ambulatory vehicle remains statically stable throughout each step of the locomotion.

Figures 13A, 13B, 13C, 13D, 13E, 13F, 13G, 13H, 13I:
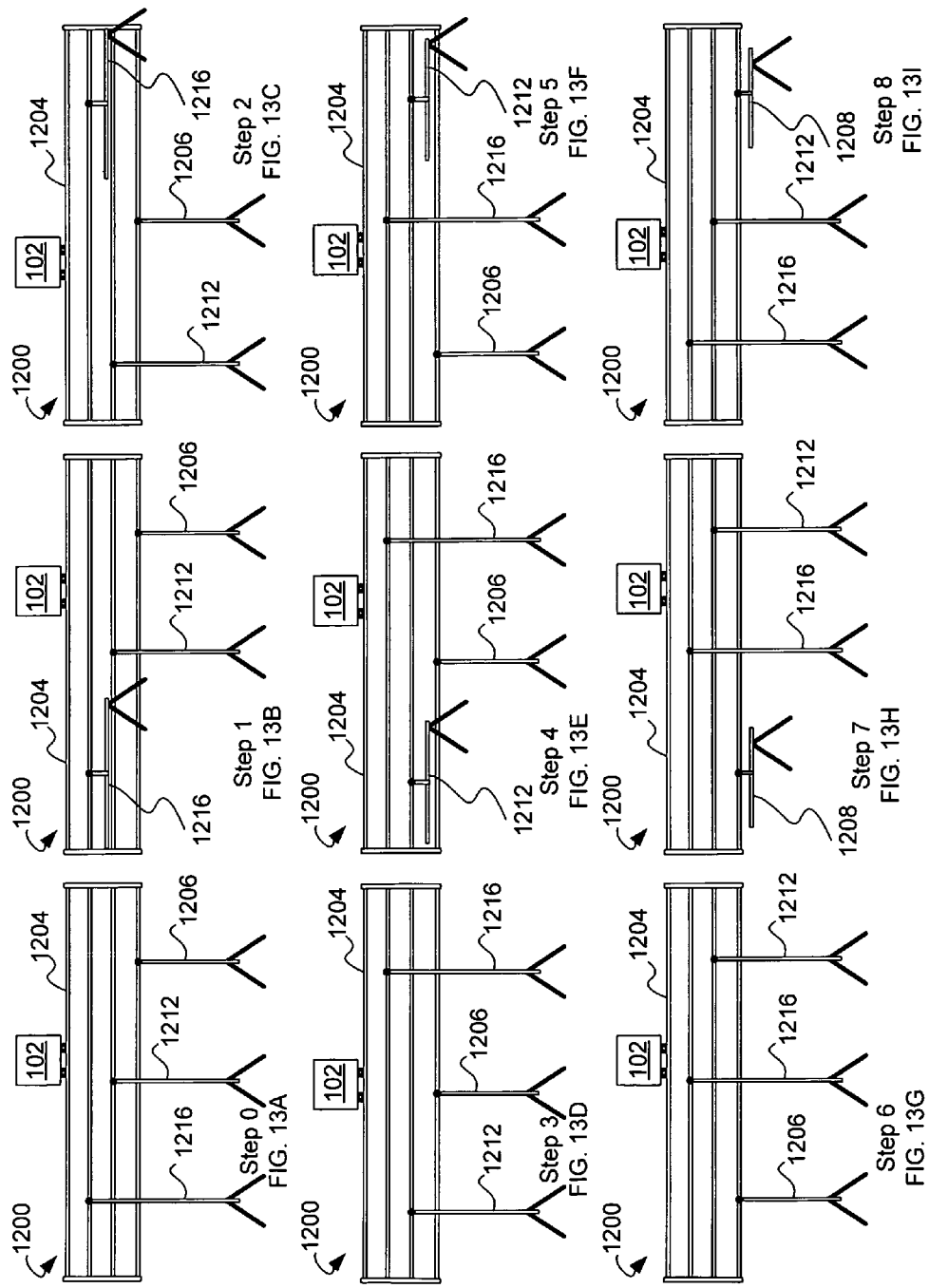
FIGS. 13A through 13I depict side views of a series of steps used by a three legged vehicle in walking locomotion, according to various embodiments of the invention.

FIG. 13A depicts a starting position, step zero, in which the load is supported by the first leg assembly 1206, the second leg assembly 1212, and the third leg assembly 1216, from left to right. In step one, depicted in FIG. 13B, the load 102 is shifted as needed between the first leg assembly 1206 and the second leg assembly 1212 to allow the third leg assembly 1216 to retract from the travel surface. FIG. 13C depicts step two in which the beam assembly 1204 and the third leg assembly 1216 have shifted in the direction of travel while the load 102 has shifted to maintain a center of gravity over the first leg assembly 1206 and the second leg assembly 1212. The third leg assembly 1216 has exchanged places with both the first leg assembly 1206 and the second leg assembly 1212 by moving from the rearward position in FIG. 13A to the forward position depicted in FIG. 13D.

FIG. 13D depicts step three of the walking locomotion where the load 102 may be supported by the first leg assembly 1206, the second leg assembly 1212, and/or the third leg assembly 1216. In step four, depicted in FIG. 13E, the load 102 has shifted into position between the first leg assembly 1206 and the third leg assembly 1216 along the length of the beam assembly 1154. The second leg assembly 1212, in the rearward position, rises above the travel surface to shift forward with the beam assembly 1204. As depicted in FIG. 13F, the second leg assembly 1212 exchanges places along the length of the beam assembly 1204 with the first leg assembly 1206 and the third leg assembly 1216.

In step 6, depicted in FIG. 13G, the load is again supported by the first leg assembly 1206, the second leg assembly 1212, and/or the third leg assembly 1216. In step seven, depicted in FIG. 13H, the load 102 shifts along the length of the beam assembly 1204 such that the first leg assembly 1206 in the rearward position is allowed to rise above the travel surface. In step 8, depicted in FIG. 13I, the first leg assembly 1206 and the beam assembly 1204 have shifted in the direction of travel such that the first leg assembly 1206 is in the forward position along the length of the beam assembly 1204. Thus, throughout the walking locomotion, each leg assembly has exchanged places with the other two leg assemblies along the length of the beam assembly 1204.

Figure 14:
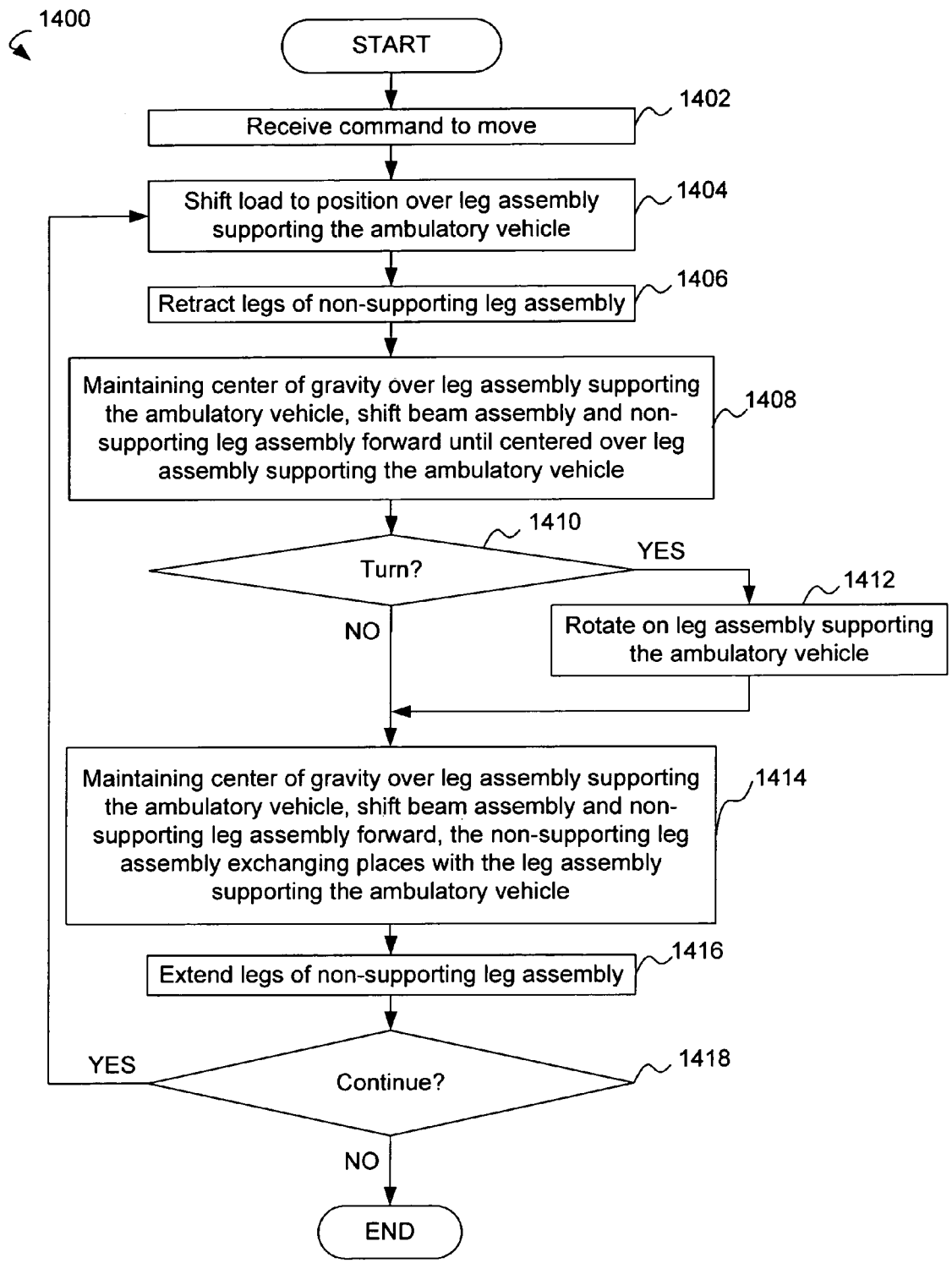
FIG. 14 is a flowchart depicting a method of walking, according to various embodiments of the invention.

FIG. 14 depicts a flowchart depicting a method of walking 1400. The method may be performed in various embodiments by the pass through ambulatory vehicle 100, the pass around ambulatory vehicle 300, the three-legged ambulatory vehicle 1200, or a three-legged ambulatory vehicle with a support such as the ambulatory vehicle 1250. For simplicity, the method 1400 is described as being performed by the ambulatory vehicle 100.

In a step 1402, the ambulatory vehicle 100 receives a command to move. The command may be received from a remote location over a communication network or via a short range signal from, for example, a remote control. Alternatively, the ambulatory vehicle 100 may comprise a computing device capable to generating commands according to environmental data received from one or more sensors installed on the ambulatory vehicle 100. In response to the command, the ambulatory vehicle 100 will commence locomotion.

In a step 1404, the ambulatory vehicle 100 shifts the load 102 into position such that the center of gravity is over a leg assembly supporting the ambulatory vehicle 100. This leg assembly may be the first leg assembly 112 or the second leg assembly 116. The load 102 is shifted such that the center of gravity of the ambulatory vehicle 100 is solely supported by this leg assembly. Depending on the weight and position of the beam assembly 108 and the non-supporting leg assembly, the position of the load 102 may not be directly over the leg assembly supporting the ambulatory vehicle 100.

In some embodiments, the load 102 may comprise a first load and a second load. These embodiments may further comprise an additional track similar to the third track 106 on which the second load may shift. The second load may shift independently of, or relative to, the first load to maintain a center of gravity over the leg assembly supporting the ambulatory vehicle 100. For example, the second load may be configured to transport passengers while the first load may include freight and/or onboard controls. In this instance, the second load may be configured to shift only slightly to maintain the comfort of the passengers while the first load shifts more dramatically to compensate for the second load while maintaining the center of gravity over the leg assembly supporting the ambulatory vehicle 100. Similarly, some embodiments may comprise further additional tracks, which upon each a load may shift.

In a step 1406, the legs 222 or 210 of the non-supporting leg assembly retract. The legs 222 or 210 can retract because the load 102 is supported solely by the other leg assembly. To retract, the legs 222 or 210 may telescope, rotate, and/or rise vertically from the travel surface.

In steps 1408 through 1416, the load 102 shifts as necessary to maintain the center of gravity of the ambulatory vehicle 100 over the leg assembly supporting the ambulatory vehicle 100 while the beam assembly 108 and the other leg assembly shift in the direction of travel. In step 1408, which is optional, the beam assembly 108 and the moving leg assembly are substantially centered over the leg assembly supporting the ambulatory vehicle 100. At this point during the gait the ambulatory vehicle 100 may change or maintain its direction of travel. If a turn is required, in a step 1410, the beam assembly 108 will rotate on the leg assembly supporting the ambulatory vehicle 100 as needed in step 1412. Whether or not a turn is executed, in step 1414, the beam assembly 108 and the other leg assembly continue to shift in the direction of travel, the other leg assembly typically exchanging places with the leg assembly supporting the ambulatory vehicle 100.

In a step 1416, the ambulatory vehicle 100 extends the legs 222 or 210 of the non-supporting leg assembly to the travel surface. The second legs 222 or 210 of the non-supporting leg assembly may telescope, rotate, and/or lower vertically, etc. to the travel surface. While the legs 222 or 210 of the non-supporting leg assembly returns to having contact with the travel surface, the legs 222 or 210 of the non-supporting leg assembly may not extend completely depending on various characteristics of the travel surface.

In step 1418, the load 102 shifts over the other leg assembly until it becomes the leg assembly solely supporting the ambulatory vehicle 100. At this point during the gait, the method 1400 returns to step 1406.

At any step, the ambulatory vehicle may be stopped. Also at any step, the ambulatory vehicle, if not already supported by only one leg assembly, may go to directly to step 1404 and change the direction of travel when it reaches step 1410.

Figure 15:
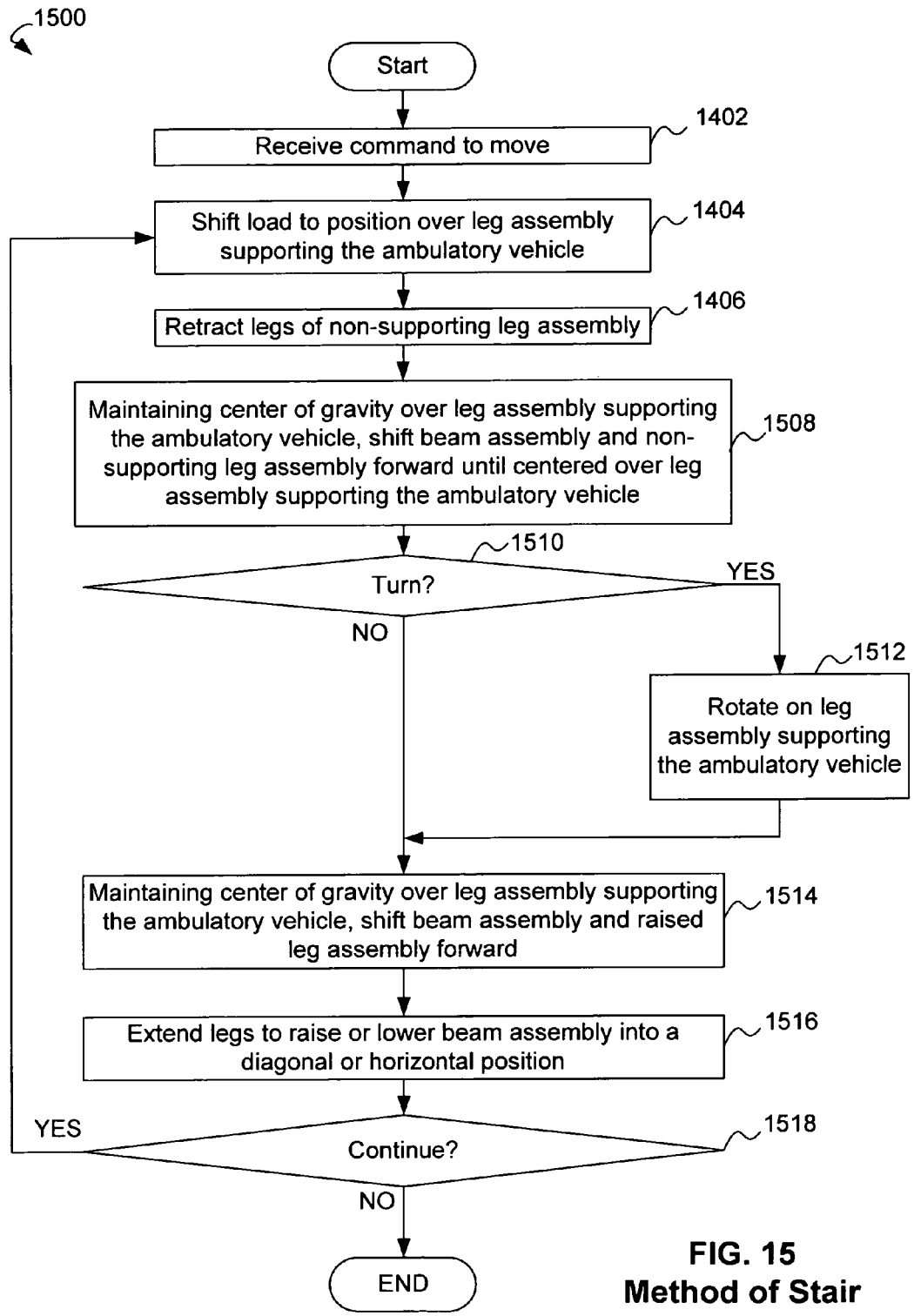
FIG. 15 is a flowchart depicting a method of stair-climbing, according to various embodiments of the invention.

FIG. 15 depicts a flowchart illustrating a method of stair-climbing 1500. The stair-climbing method may be used on terrain other than stairs such as terraces or mild to steep grades, or terrain that is uneven. The method may be performed by various embodiments including the pass through ambulatory vehicle 100, the pass around ambulatory vehicle 300, the three-legged ambulatory vehicle 1200, or a three-legged ambulatory vehicle with a support such as the ambulatory vehicle 1250. For simplicity, the method 1500 is described as being performed by the ambulatory vehicle 100.

In some embodiments, the legs require only enough power to passively change their length and/or retract and extend. In typical embodiments, the legs do not need to move or change length while supporting the vehicle. The power required at the supporting gimbal mount to tilt and/or rotate the beam assembly is minimized by requiring the center of gravity to be over the supporting mount.

Steps 1402 through 1406 are performed as described in reference to FIG. 14. In a step 1508, the beam assembly 108 and the moving leg assembly are substantially centered over the leg assembly supporting the ambulatory vehicle 100. At this point during the gait the ambulatory vehicle 100 may change or maintain its direction of travel. If a turn is required, in a step 1510, the beam assembly 108 will rotate on the leg assembly supporting the ambulatory vehicle 100 as needed in step 1512. The beam assembly 108 may be diagonally tilted in the direction of travel or level with respect to a horizontal axis. The load 102 may shift slightly to maintain the center of gravity of the ambulatory vehicle 100 over the leg assembly supporting the ambulatory vehicle 100. In step 1510, when the moving leg assembly and the beam assembly 108 are substantially centered over the leg assembly supporting the ambulatory vehicle 100, the ambulatory vehicle 100 may turn. If the ambulatory vehicle 100 does turn, the ambulatory vehicle 100 rotates on the leg assembly supporting the ambulatory vehicle 100 in step 1512. To continue the movement, in step 1514, the load 102 continues to shift to maintain the center of gravity over the leg assembly supporting the ambulatory vehicle 100 while the retracted leg assembly and the beam assembly 108 shift in the direction of travel and the retracted leg assembly exchanges places with the leg assembly supporting the ambulatory vehicle 100.

In step 1516, like step 1502, the legs 222 or 210 extend to the travel surface. The legs 222 or 210 optionally extend to a point where the beam assembly 108 is substantially horizontal or tilted in the direction of travel. In step 1518, the ambulatory vehicle 100 may stop or continue movement. If movement is continued, then the method returns to step 1404 where the load 102 is again shifted.

At any step, the ambulatory vehicle may be stopped. Also at any step, the ambulatory vehicle, if not already supported by only one leg assembly, may go to directly to step 1404 and change the direction of travel when it reaches step 1410.

Figure 16:
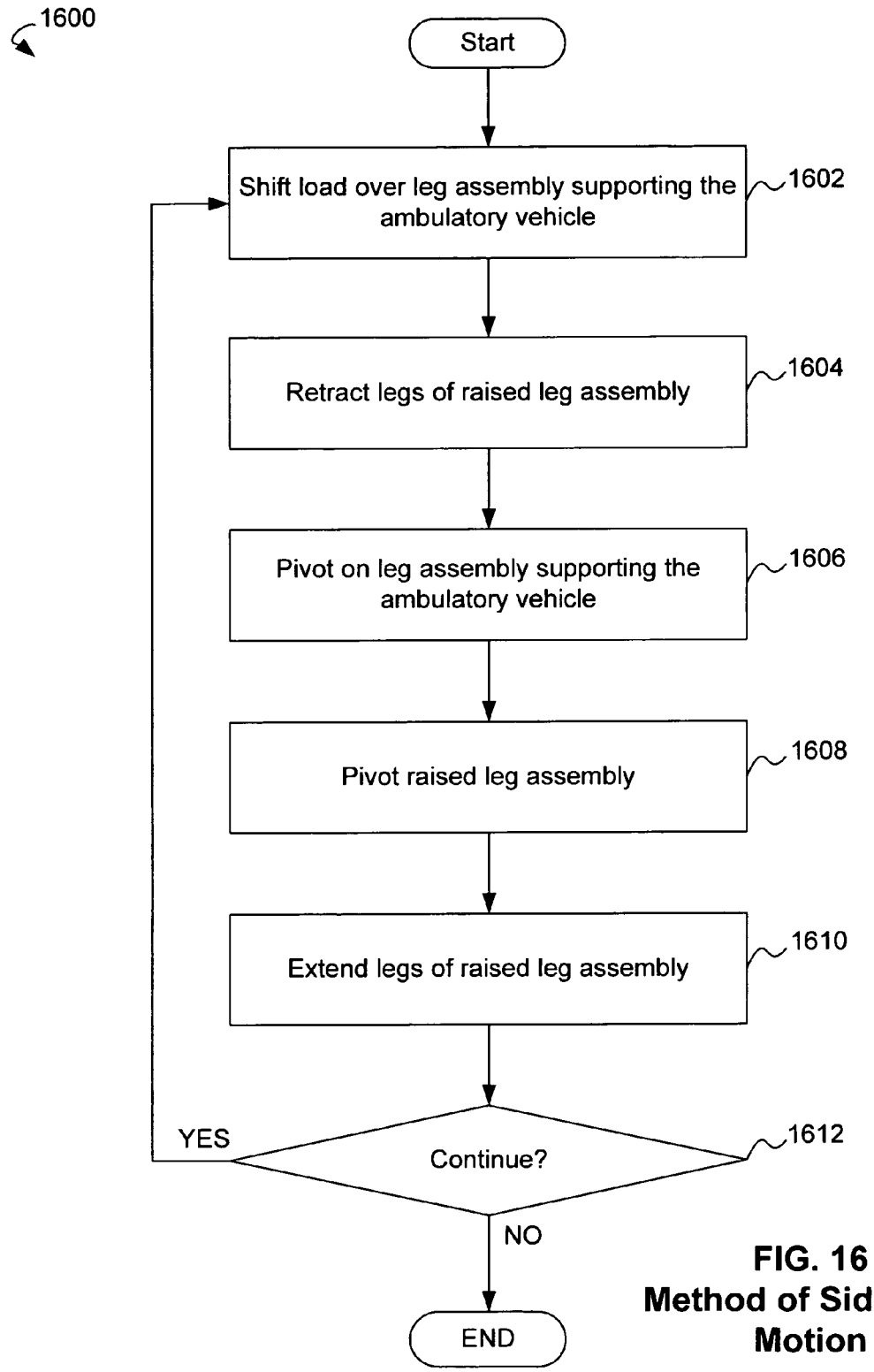
FIG. 16 is a flowchart depicting a method of navigating sideways, according to various embodiments of the invention.

FIG. 16 is a flowchart depicting a method 1600 for moving sideways, for example, up or down a slope. The method 1600 may be used when the travel surface is very steep or when other methods may not be possible due to obstacles. The method 1600 is different from the other methods discussed herein because the leg assemblies do not exchange places along the length of the beam assembly. The method 1600 may be performed by various embodiments including the pass through ambulatory vehicle 100, the pass around ambulatory vehicle 300, the three-legged ambulatory vehicle 1200, or a three-legged ambulatory vehicle with a support such as the ambulatory vehicle 1250. For simplicity, the method 1600 is described as being performed by the ambulatory vehicle 100. The starting position is assumed to be with the load 102 between the leg assemblies with each leg assembly near an opposite end. The direction of travel is assumed to be not far from perpendicular to the long axis of the ambulatory vehicle 100.

In step 1602, the load 102 shifts over a leg assembly supporting the ambulatory vehicle 100 such that the center of gravity is over the leg assembly which therefore solely supports the ambulatory vehicle 100. In step 1604, the legs 222 or 210 of the non-supporting leg assembly retract such that they are no longer in contact with the travel surface.

In step 1606, the beam assembly 108 pivots around the vertical axis of the gimbal mount which is part of the supporting leg assembly such that unsupported end swings approximately in the direction of travel. In some embodiments, the retracted leg assembly shifts towards the leg assembly supporting the ambulatory vehicle 100 prior to pivoting. In some embodiments, the gimbal joint may rotate up to 180 degrees clockwise or counter-clockwise with respect to the direction of travel.

In optional step 1608, the retracted leg assembly pivots into a position that is substantially parallel to the first leg assembly. The retracted leg assembly pivots using the gimbal joint coupling it to the beam assembly 108. By pivoting back, the gimbal joint in the retracted leg assembly will be able to pivot at a greater angle during a next step. The retracted leg assembly pivots in the reverse direction of step 1606. In some embodiments, the retracted leg assembly may pivot a larger or smaller angle than the angle in step 1606. After pivoting back, the leg of the retracted leg assembly extends to the travel surface in step 1610. In step 1612, the load 102 shifts to be over the retracted leg assembly such that the recently retracted leg assembly becomes the leg assembly supporting the ambulatory vehicle 100. In some embodiments, ambulatory vehicle 100 may include more than four tracks. In various embodiments, the lengths of legs are configured to change lengths.

Several embodiments are specifically illustrated and/or described herein. However, it will be appreciated that modifications and variations are covered by the above teachings and within the scope of the appended claims without departing from the spirit and intended scope thereof. For example, the load 102 may be distributed among more than one load module and/or track, other gaits may be implemented using similar movements, or the ambulatory vehicle may be able to flip over. The rail on which the load 102 rides (e.g., the third track 106) may optionally extend beyond the rails to which the leg assemblies are attached (e.g., the first track 110 and the second track 114). The systems described herein may include a housing, e.g., flexible boot, configured for the ambulatory vehicle to operate in harsh environments, or submerged in a liquid. The systems described herein may be controlled by a computing device and sensors (not shown), and/or by a human operator. In some embodiments, components are configured to recover braking energy. In some embodiments, the first leg assembly is configured such that the beam assembly can rotate 360 degrees around the first leg assembly.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An ambulatory vehicle for transporting a load from a first location to a second location, comprising:
    a beam assembly comprising a first track, a second track and a third track, the third track configured to bear the load placed thereon, the load configured to shift along a length of the beam assembly;
    a first leg assembly coupled to the first track of the beam assembly, the first leg assembly configured to support the beam assembly and move along the length of the beam assembly; and
    a second leg assembly coupled to the second track of the beam assembly, the second leg assembly configured to support the beam assembly, move along the length of the beam assembly, and exchange places along the length of the beam assembly with the first leg assembly, wherein the first leg assembly or the second leg assembly are coupled to the beam assembly using a gimbal mount and wherein the first leg assembly passes through or outside of the second leg assembly.

2. The ambulatory vehicle of claim 1, further comprising a third leg assembly coupled to a fourth track of the beam assembly, the third leg assembly configured to support the beam assembly, move along the length of the beam assembly, and to exchange places along the length of the beam assembly with the first leg assembly or the second leg assembly.

3. The ambulatory vehicle of claim 1, wherein a first leg and a second leg are configured to retract from terrain prior to moving along the length of the beam assembly.

4. The ambulatory vehicle of claim 1, wherein the third track is further configured to shift a load placed on the third track relative to the beam assembly or a first leg to maintain a center of gravity of the system over a second leg while the first leg exchanges places along the length of the beam assembly with the second leg.

5. The ambulatory vehicle of claim 1, further comprising a load placed on the third track, wherein the load, the beam assembly or the second leg is configured to shift relative to a travel surface to maintain a center of gravity of the system over a first leg while a second leg exchanges places along the length of the beam assembly with the first leg.

6. The ambulatory vehicle of claim 1, further including a housing configured for the ambulatory system to operate in harsh environments.

7. The ambulatory vehicle of claim 1, wherein the first leg assembly is configured to recover braking energy.

8. The ambulatory vehicle of claim 1, wherein the second leg assembly includes legs configured to telescope.

9. The ambulatory vehicle of claim 1, further comprising roller on the third track and a load on the roller, the load configured to shift on the roller along a length of the third track.

10. An ambulatory vehicle for transporting a load from a first location to a second location, comprising:
    a beam assembly comprising a first track, a second track and a third track, the third track configured to bear the load placed thereon, the load configured to shift along a length of the beam assembly;
    a first leg assembly coupled to the first track of the beam assembly using a gimbal mount, the first leg assembly configured to support the beam assembly and to move along the length of the beam assembly, the first leg assembly further configured such that the beam assembly can rotate 360 degrees around the gimbal mount of the first leg assembly; and
    a second leg assembly coupled to the second track of the beam assembly using a gimbal mount, the second leg assembly configured to support the beam assembly, move along the length of the beam assembly, and exchange places along the length of the beam assembly with the first leg assembly, wherein the first leg assembly passes through the second leg assembly.

11. An ambulatory vehicle for transporting a load from a first location to a second location, comprising:
    a beam assembly comprising a first track, a second track and a third track, the third track configured to bear the load placed thereon, the load configured to shift along a length of the beam assembly;
    a first leg assembly comprising a first leg, the first leg assembly coupled to the first track of the beam assembly and configured to support the beam assembly and move along the length of the beam assembly; and
    a second leg assembly comprising a second leg, the second leg assembly coupled to the second track of the beam assembly and configured to support the beam assembly and move along the length of the beam assembly, the second leg assembly configured to pass around or pass through or outside the first leg, the first leg assembly configured to pass through the second leg assembly, wherein the first leg assembly or the second leg assembly are coupled to the beam assembly using a gimbal mount.

12. The ambulatory vehicle of claim 11, wherein a load placed on the third track, the beam assembly, or the first leg assembly are configured to shift relative to a travel surface to maintain a center of gravity over the second leg while the first leg exchanges places with the second leg.

13. The ambulatory vehicle of claim 11, further comprising a third leg assembly coupled to a fourth track of the beam assembly, the third leg assembly configured to support the beam assembly, move along the length of the beam assembly, and pass around or pass through the first leg assembly or the second leg assembly.

14. The ambulatory vehicle of claim 11, wherein the first leg is configured to pass through the second leg.

15. The ambulatory vehicle of claim 11, wherein the third track is configured to shift a load placed thereon and to maintain a movable center of gravity through movement of the load.

* * * * *

UNITED STATES PATENT AND TRADEMARK OFFICE
CERTIFICATE OF CORRECTION

PATENT NO. : 7,604,075 B1  Page 1 of 1
APPLICATION NO. : 11/484788
DATED : October 20, 2009
INVENTOR(S) : H. Phillip Limbacher, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 243 days.

Signed and Sealed this

Fifth Day of October, 2010

David J. Kappos
*Director of the United States Patent and Trademark Office*